United States Patent
Sugiyama

(10) Patent No.: US 8,248,694 B2
(45) Date of Patent: Aug. 21, 2012

(54) ELECTRO-OPTICAL APPARATUS AND ELECTRONIC EQUIPMENT

(75) Inventor: Nobuo Sugiyama, Azumino (JP)

(73) Assignee: Epson Imaging Devices Corporation (JP)

( * ) Notice: Subject to any disclaimer, the term of this patent is extended or adjusted under 35 U.S.C. 154(b) by 836 days.

(21) Appl. No.: 11/624,417

(22) Filed: Jan. 18, 2007

(65) Prior Publication Data

US 2007/0165145 A1 Jul. 19, 2007

(30) Foreign Application Priority Data

Jan. 19, 2006 (JP) .................................. 2006-011172

(51) Int. Cl.
*G02B 27/22* (2006.01)
*G02F 1/1335* (2006.01)

(52) U.S. Cl. ........ 359/465; 359/463; 359/462; 359/271; 349/15

(58) Field of Classification Search .................. 359/465, 359/462, 463, 271; 349/15
See application file for complete search history.

(56) References Cited

U.S. PATENT DOCUMENTS

| | | | | |
|---|---|---|---|---|
| 5,113,285 | A | * | 5/1992 | Franklin et al. ............... 359/465 |
| 5,917,562 | A | * | 6/1999 | Woodgate et al. ............. 349/15 |
| 6,377,295 | B1 | * | 4/2002 | Woodgate et al. ............. 348/59 |

| | | | |
|---|---|---|---|
| 2005/0046951 | A1 | 3/2005 | Sugihara et al. |
| 2006/0098281 | A1 | 5/2006 | Fukushima et al. |
| 2006/0209371 | A1 | 9/2006 | Hamagishi |
| 2006/0209407 | A1 | 9/2006 | Hamagishi |

FOREIGN PATENT DOCUMENTS

| | | |
|---|---|---|
| JP | 06-078342 | 3/1994 |
| JP | 2857429 | 11/1998 |
| JP | 2005-077437 | 3/2005 |
| WO | WO2004-036287 | 4/2004 |

* cited by examiner

*Primary Examiner* — Audrey Y Chang
(74) *Attorney, Agent, or Firm* — Harness Dickey & Pierce, P.L.C.

(57) ABSTRACT

An electro-optical apparatus includes a display panel that displays an image, an illuminating device that allows light rays to pass through the display panel, a polarization axis controlling unit arranged between the illuminating device and the display panel for allowing light rays having first polarization axis out of light rays outputted from the illuminating device to pass and changing the polarization axes of part of the light rays emitted from the illuminating device to convert the light rays to light rays having second polarization axis different from the first polarization axis, and a lens having a plurality of linear lens patterns for causing the light rays having the first polarization axis and the light rays having the second polarization axis separated by the polarization axis controlling unit respectively to proceed in predetermined directions. The polarization axis controlling unit includes a liquid crystal layer and a plurality of electrodes arranged in a stripe pattern so as to oppose the liquid crystal layer. The width of the electrodes to which a voltage is applied when changing the polarization axes of the part of the light rays emitted from the illuminating device is larger than the width of the electrode to which no voltage is applied.

9 Claims, 16 Drawing Sheets

ELECTRO-OPTICAL APPARATUS AND ELECTRONIC EQUIPMENT

BACKGROUND

1. Technical Field

The present invention relates to an electro-optical apparatus suitable for displaying various types of information, and electronic equipment.

2. Related Art

Examples of an electro-optical apparatus are an image display apparatus such as a stereoscopic image display apparatus for displaying a three-dimensional stereoscopic image and a two-screen display device that displays different images for observers at different observing positions. In Japanese Patent No. 2857429, an image display apparatus which can achieve stereoscopic display of a parallax barrier system is described as one of the systems of the stereoscopic display apparatus which can display a three-dimensional stereoscopic image. In this image display apparatus, predetermined shaped openings and light-shielding portions are arranged in a stripe pattern at predetermined positions of an electronic parallax barrier by controlling the electronic parallax barrier arranged on the observer's side of the image display surface with control device such as a microcomputer. For example, the openings of the electronic parallax barrier are formed so that an image for the left eye enters into the observer's left eye, and an image for the right eye enters into the observer's right eye when presenting a three-dimensional stereoscopic image to the observer. It is also configured to allow the entire image to enter both of the observer's eyes by controlling the electronic parallax barrier to form an opening over the entire area when presenting a two-dimensional (plane) image to the observer.

In the related art, there is also an image display apparatus provided with a barrier having slit-shaped openings and light-shielding portions arranged on the observer side of the display panel so that two-screen display which presents different images to observers at different observing positions is achieved.

However, in the image display apparatus described in Japanese Patent No. 2857429, the electronic parallax barrier is arranged on the observer's side of the image display surface. Therefore, part of the light outputted from the image display surface is disadvantageously shielded by the shielding portions of the electronic parallax barrier. Consequently, there arises a problem such that the image appears to be dark since the luminance of the image observed by the observer is too low. In the image display apparatus which can achieve the two-screen display in the related art, there is a problem such that it has a property that the observation range of the observer is proportional to one pixel pitch of the display panel, and hence when the pixel pitch is lowered, the observation range of the observer is also decreased, which makes provision of a high quality image to observers at different observing positions difficult.

Therefore, recently, an image display apparatus for achieving two-screen display and stereoscopic image display by controlling the direction of light rays having polarization axes in different directions with a lenticular lens has been developed. In such an image display apparatus, a polarization controlling liquid crystal panel is used on the light-incident side of the lenticular lens for generating light rays having polarization axes in the directions different from each other. The polarization controlling liquid crystal panel includes a pair of substrates, liquid crystal held between the pair of substrates, and a plurality of electrodes arranged in a stripe pattern on the inner surface of one of the substrates. The polarization controlling liquid crystal panel applies a voltage to a predetermined electrode out of the plurality of electrodes formed in the stripe pattern to change the alignment of the liquid crystal corresponding to the position of the predetermined electrode. Accordingly, the polarization controlling the liquid crystal panel can output light rays entering the polarization controlling liquid crystal panel as light rays which pass through the liquid crystal corresponding to the positions of the predetermined electrodes and light rays which pass through the liquid crystal corresponding to the positions other than the positions of the predetermined electrode having polarization axes in directions different from each other.

However, there is a problem in the image display apparatus using the lenticular lens such that in the case of the two-screen display, the boundary between two images may be shifted from the center of the display screen when presenting the different images to the observers at the different observing positions. There is also a problem such that part of the image to be presented to one observer may be intermixed with an image to be presented to the other observer.

SUMMARY

An advantage of some aspects of the invention is to improve the display quality of an electro-optical apparatus as described above.

According to an aspect of the invention, an electro-optical apparatus includes a display panel that displays an image, an illuminating device that allows light rays to pass through the display panel, a polarization axis controlling unit arranged between the illuminating device and the display panel for allowing light rays having first polarization axis out of light rays outputted from the illuminating device to pass and changing the polarization axes of part of the light rays emitted from the illuminating device to convert the light rays to light rays having second polarization axis different from the first polarization axis; a lens arranged between the polarization axis controlling unit having a plurality of linear lens patterns for causing the light rays having the first polarization axis and the light rays having the second polarization axis separated by the polarization axis controlling unit respectively to proceed in predetermined directions, wherein the polarization axis controlling unit includes a liquid crystal layer, and a plurality of electrodes arranged in a stripe pattern so as to oppose the liquid crystal layer, and wherein, out of the plurality of electrodes which correspond to one of the lens patterns, the width of the electrodes to which a voltage is applied when changing the polarization axes of the part of the light rays emitted from the illuminating device is larger than the width of the electrodes to which no voltage is applied.

The electro-optical apparatus is, for example, an image display apparatus for achieving two-screen display or stereoscopic image display, and includes the display panel, the illuminating device, the polarization axis controlling unit, and the lens having a plurality of linear-shaped lens patterns. The display panel displays an image. The illuminating device is so-called back light, and allows the light rays to pass through the display panel. The polarization axis controlling unit is, for example, a polarization controlling liquid crystal panel, and allows the light rays having the first polarization axis out of the light rays emitted from the illuminating device to pass and changing the polarization axes of the part of the light rays emitted from the illuminating device to convert the light rays to light rays having the second polarization axis different from the first polarization axis. The lens having the plurality of linear-shaped lens patterns is, for example, a lenticular lens, which is arranged between the polarization axis controlling unit and the display panel for causing the light rays having the first polarization axis and the light rays having the second polarization axis separated by the polarization axis controlling unit to proceed in the predetermined directions respectively. The polarization axis controlling unit includes the liquid crystal layer and the plurality of electrodes arranged in a stripe pattern so as to oppose the liquid crystal layer and, out of the plurality of electrodes which correspond to one of the lens patterns, the width of the electrodes to which a voltage is applied when changing the polarization axis of the part of the light rays out of the light rays emitted from the illuminating device is formed to be larger than the width of the electrodes to which no voltage is applied. The area from which the polarized light rays can be outputted can be increased by using such polarization axis controlling unit than using the polarization axis controlling unit in which the width of the electrodes to which the voltage is applied is the same as the width of the electrodes to which no voltage is applied. Accordingly, the output direction of the light rays having the first polarization axis and the light rays having the second polarization axis from the polarization axis controlling unit can be adjusted appropriately, and hence the quality of display can be adjusted appropriately.

According to a preferable embodiment of the invention, in the electro-optical apparatus shown above, the mode can be switched between the plane image display mode and the two-screen display mode by controlling the presence and absence of a voltage applied to the plurality of electrodes.

According to an aspect of the invention, in the electro-optical apparatus shown above, the sets of electrodes including the electrode to which the voltage is applied and the electrode to which no voltage is applied are provided so that each set corresponds to each one of the lens patterns. Accordingly, when presenting different images to the observers at different observing positions in the two-screen display mode, the boundary between the images is prevented from being shifted from the center of the display screen, that is, the position of the boundary between the observation ranges of the observers at the different observing positions is prevented from being shifted from the center of the display screen. Simultaneously, ingress of the image to be presented to one of the observer partly into the observation range of the other observer can be prevented.

According to a preferable embodiment of the invention, in the electro-optical apparatus, the mode is switched between the plane-image display mode and the stereoscopic image display mode by controlling the presence and absence of a voltage applied to the plurality of electrodes.

According to another aspect of the invention, in the electro-optical apparatus, the sets of the electrodes including an electrode to which the voltage is applied and an electrode to which no voltage is applied are provided so that two sets each correspond to each one of the lens patterns. Accordingly, the position of the boundary between the observation ranges of the observers at different observing positions is prevented from being shifted from the center of the display screen in the stereoscopic image display mode. The position on the display screen to be placed at the center between the eyes of the observer for viewing the stereoscopic display image can be placed to a position close to the center of the observation range of the observer According to other aspect of the invention, electronic equipment includes the electro-optical apparatus as described above in the display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
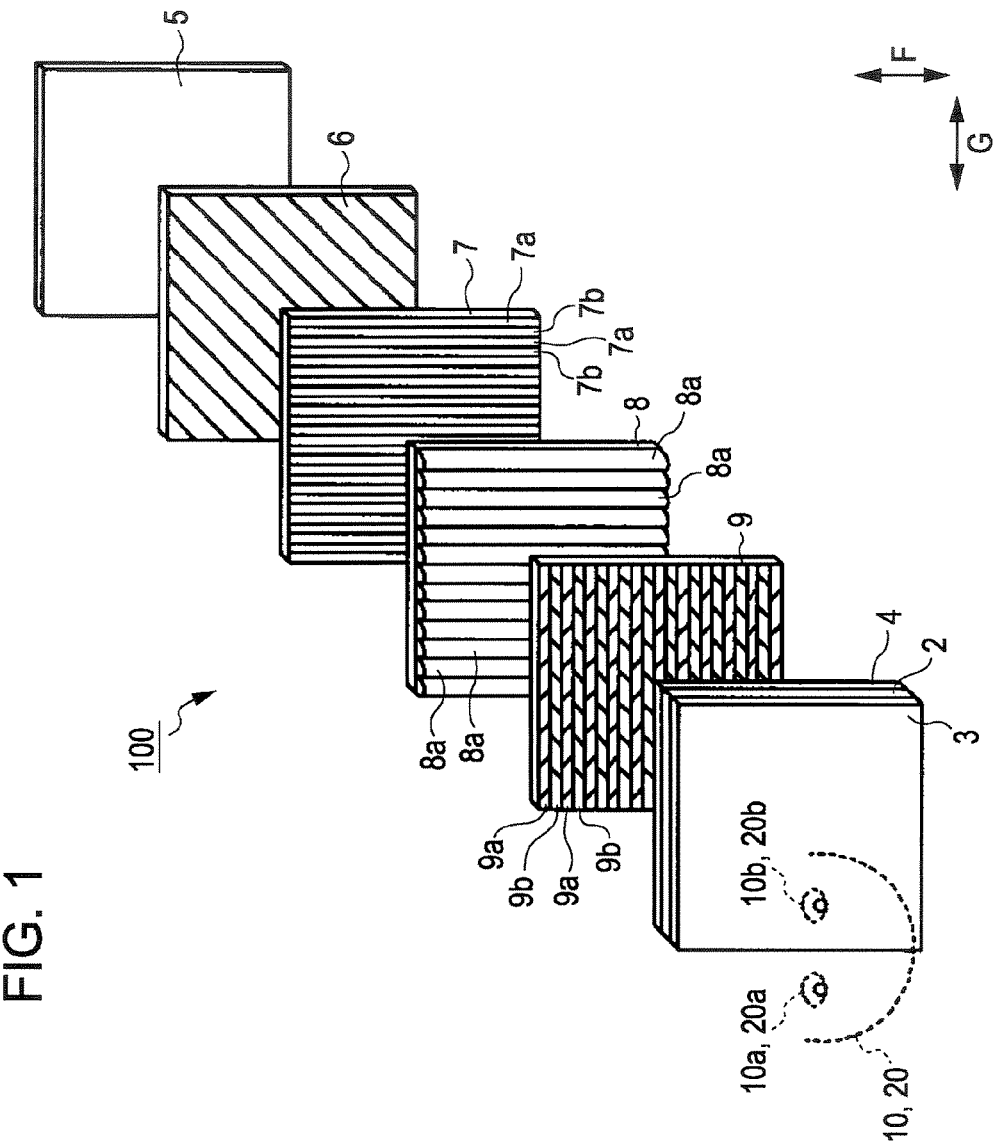
FIG. 1 is an exploded perspective view showing an image display apparatus according to a first embodiment of the invention.

Referring now to the drawings, an embodiment of the invention will be described.

First Embodiment

Figure 2:
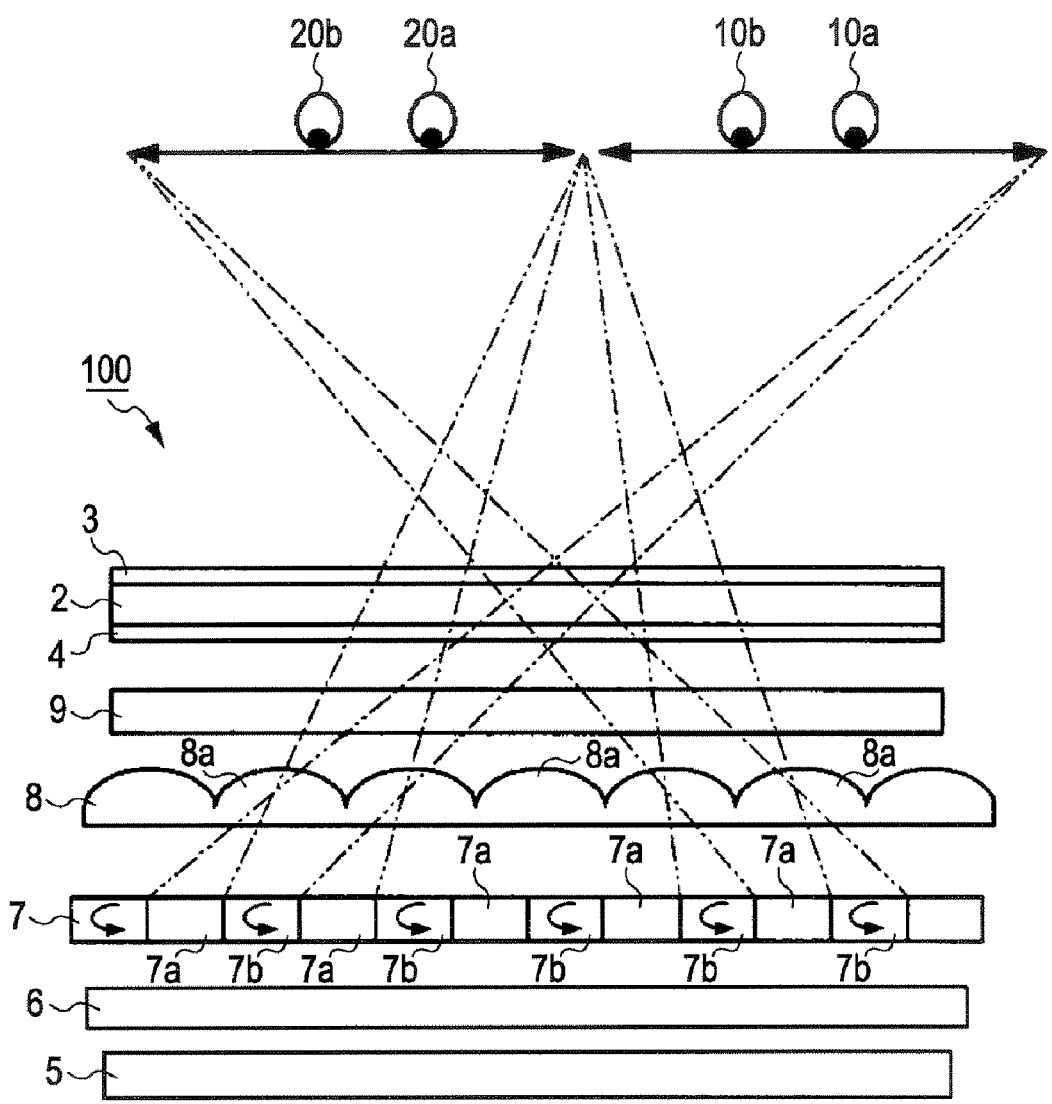
FIG. 2 is a drawing showing the image display apparatus in a state in which an observer views the image display apparatus from above.
Figure 3:
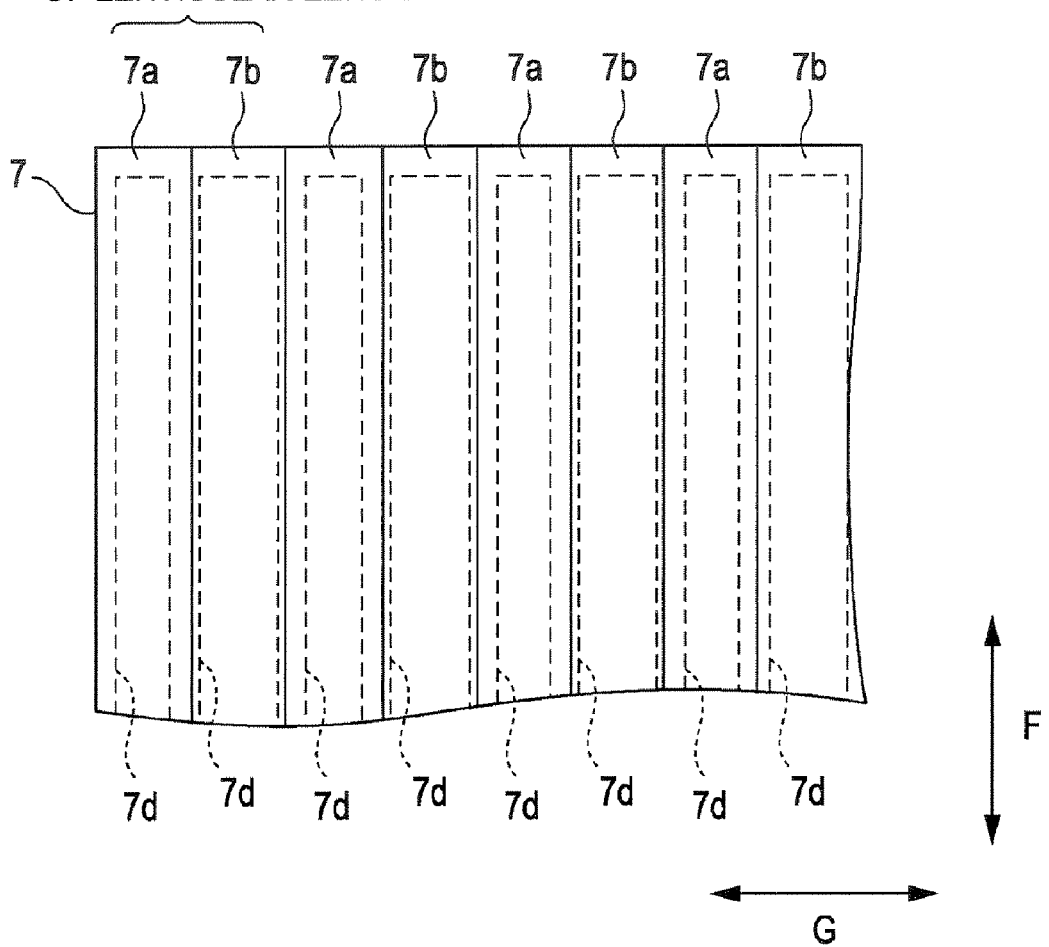
FIG. 3 is a partly enlarged drawing of a polarization controlling liquid crystal panel of the image display apparatus according to the first embodiment.
Figure 4:
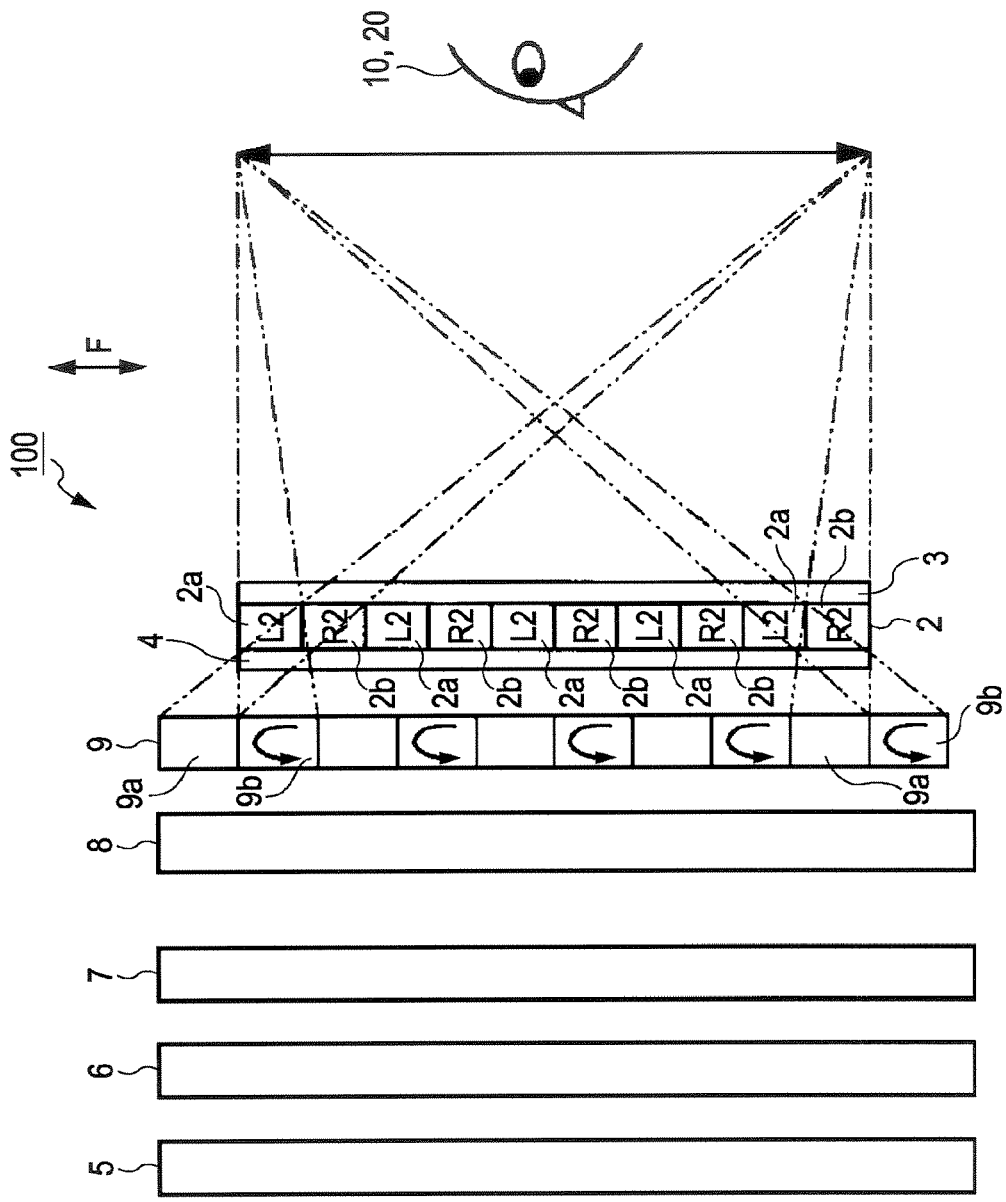
FIG. 4 is a drawing showing the image display device in a state in which the observer views the image display apparatus from the side.
Figure 5:
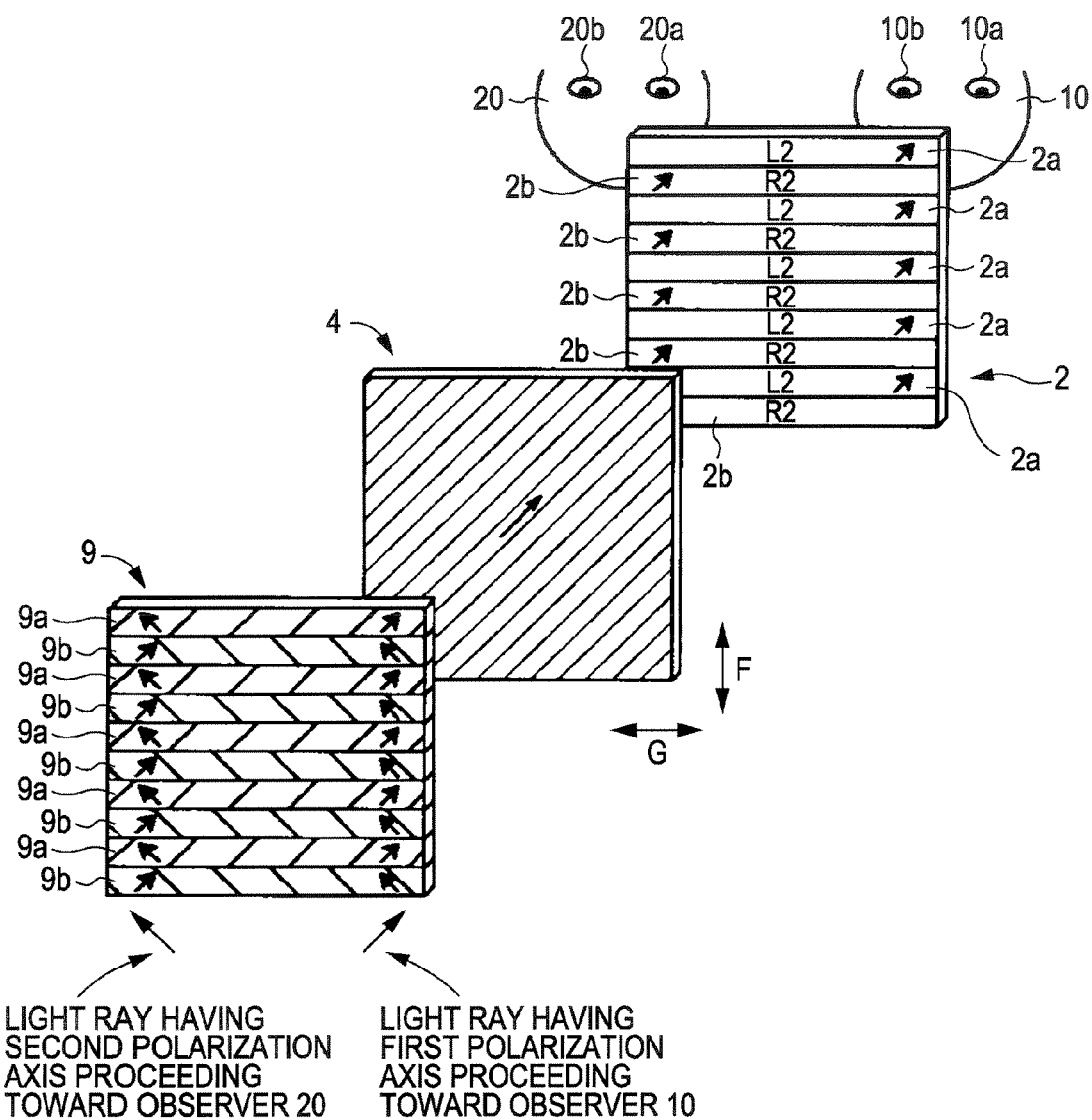
FIG. 5 is an exploded perspective view for explaining the principle of the image display apparatus according to the first embodiment.

FIG. 1 is an exploded perspective view showing an image display apparatus 100 according to a first embodiment of the invention. The image display apparatus 100 according to the first embodiment achieves two-screen display that presents different images to a plurality of observers at different observing positions. FIG. 2 is an explanatory drawing showing a principle of the image display apparatus 100 according to the first embodiment of the invention shown in FIG. 1 in a state in which an observer views the display panel from above. FIG. 3 is a partly enlarged drawing of a polarization controlling liquid crystal panel of the image display apparatus 100 according to the first embodiment of the invention shown in FIG. 1. FIG. 4 is an explanatory drawing showing a principle of the image display apparatus 100 according to the first embodiment of the invention shown in FIG. 1 in a state in which the observer views the image display apparatus 100 from the side. FIG. 5 is an exploded perspective view for explaining the principle of the image display apparatus 100 according to the first embodiment of the invention shown in FIG. 1. Referring now to FIGS. 1 to 5, the configuration of the image display apparatus 100 according to the first embodiment of the invention will be described.

As shown in FIGS. 1 and 2, the image display apparatus 100 according to the first embodiment of the invention includes a display panel 2 that displays an image, polarizing plates 3 and 4 arranged so as to interpose the display panel 2, a back light 5 for irradiating light to the display panel 2, and a polarizing plate 6 arranged on the side of observers 10 and 20 (see FIG. 2) of the back light 5. The polarizing plates 3 and 4 being arranged so as to sandwich the display panel 2 have polarization axes orthogonal to each other. The polarizing plate 4 has a function allowing light rays having a first polarization axis to pass and absorb light rays having a second polarizing axis substantially orthogonal to the first polarizing axis. The polarizing plate 3 has a function to allowing light rays having a second polarization axis substantially orthogonal to the first polarizing axis to pass and absorbs light rays having the first polarization axis. The polarizing plate 6 is configured to allow the light rays having the first polarization axis to pass from the light irradiated from the back light 5.

In the first embodiment, a polarization controlling liquid crystal panel 7 is arranged on the side of the observers 10 and 20 of the polarizing plate 6. The polarization controlling liquid crystal panel 7 includes a pair of substrates and liquid crystal held between the pair of substrates. One of the pair of substrates is formed with a plurality of electrodes 7d in a stripe pattern on the inner surface thereof. The other substrate is formed with an electrode over the entire surface on the inner surface thereof. The polarization controlling liquid crystal panel 7 includes polarization controlling areas 7a for allowing light rays having the first polarization axis irradiated from the backlight 5 via the polarizing plate 6 to pass therethrough and polarization controlling areas 7b for changing the light rays having the first polarization axis to the light rays having the second polarization axis substantially orthogonal to the first polarization axis. The polarization controlling areas 7a and 7b of the polarization controlling liquid crystal panel 7 extend in a direction substantially orthogonal to a segment connecting a left eye 10a (20a) and a right eye 10b (20b) of the observer 10 (20) (a direction vertical to the plane of FIG. 2 (the direction F in FIG. 1)), and are provided alternately in the direction G. Each of the plurality of electrodes 7d corresponds to each of the polarization controlling areas 7a and 7b (see FIG. 3).

Then, at the time of two-screen display, described later, a voltage is applied to the electrodes 7d corresponding to the polarization controlling areas 7b, and no voltage is applied to the electrodes 7d corresponding to the polarization controlling areas 7a. That is, the plurality of electrodes 7d in the polarization controlling liquid crystal panel 7 are controlled so that the application or non-application of voltage are switched alternately, and hence the alignment of the liquid crystal corresponding to the polarization controlling areas 7b is changed. Accordingly, the light rays entering the polarization controlling areas 7a are outputted without being polarized, and the light rays entering the polarization controlling areas 7b are polarized before being outputted, whereby the polarization controlling liquid crystal panel 7 can output the light rays having different polarization axes from each other. In the image display apparatus 100 according to the first embodiment, the mode can be switched between a normal plain image display mode and a two-screen display mode by controlling the presence and absence of a voltage applied to the electrodes 7d. In the plain image display mode, a voltage is applied to both of or none of the electrodes 7d of the polarization controlling areas 7a and the electrodes 7d of the polarization controlling areas 7b.

Although detailed description will be given later, as shown in FIG. 3, in the polarization controlling liquid crystal panel 7 according to an aspect of the invention, the width of the electrodes 7d corresponding to the polarization controlling areas 7b to which the voltage is applied is formed so as to be larger than the width of the electrodes 7d corresponding to the polarization controlling areas 7a to which no voltage is applied. The width of the electrodes 7d here means the width in the direction (the direction G) which intersects the direction (the direction F) of the electrodes 7d extending in the stripe pattern. In this configuration, the direction of emission of the light rays having the first polarization axis and the light rays having the second polarization axis from the polarization controlling liquid crystal panel 7 can be adjusted appropriately, so that the display quality can be adjusted appropriately.

In the first embodiment, as shown in FIGS. 1 and 2, a lenticular lens 8 is arranged on the side of the observers 10 and 20 of the polarization controlling liquid crystal panel 7. The lenticular lens 8 includes a plurality of substantially semi-columnar-shaped lens patterns 8a formed so as to extend in the direction F in FIG. 1. The lenticular lens 8 including the plurality of lens patterns 8a has a function allowing light rays separated by the polarization controlling liquid crystal panel 7 having the different polarization axes to proceed toward the observers 10 and 20.

In the first embodiment, a wave plate 9 is arranged between the lenticular lens 8 and the polarizing plate 4 mounted on the display panel 2. The wave plate 9 includes transmissive areas 9a for allowing light rays having the first polarization axis and polarizing area 9b for converting the light rays having the first polarization axis to the light rays having the second polarization axis. The transmissive areas 9a and the polarizing areas 9b extend in the direction G substantially orthogonal to the direction F and are provided alternately in the direction F as shown in FIGS. 1 and 5.

In the first embodiment, as shown in FIGS. 4 and 5, pixel arrays 2a and 2b extend in the direction G (see FIG. 5) and are provided alternately in the direction F on the display panel 2. The pixel arrays 2a and 2b on the display panel 2 are provided so as to correspond to the transmissive areas 9a and the polarizing areas 9b of the wave plate 9 provided so as to extend in the direction G. The polarizing plate 6, the polarization controlling liquid crystal panel 7, the lenticular lens 8, the wave plate 9 and the polarizing plate 4 are arranged between the display panel 2 and the back light 5 as shown in FIGS. 1 and 2.

Two-screen Display Mode

Figure 6:
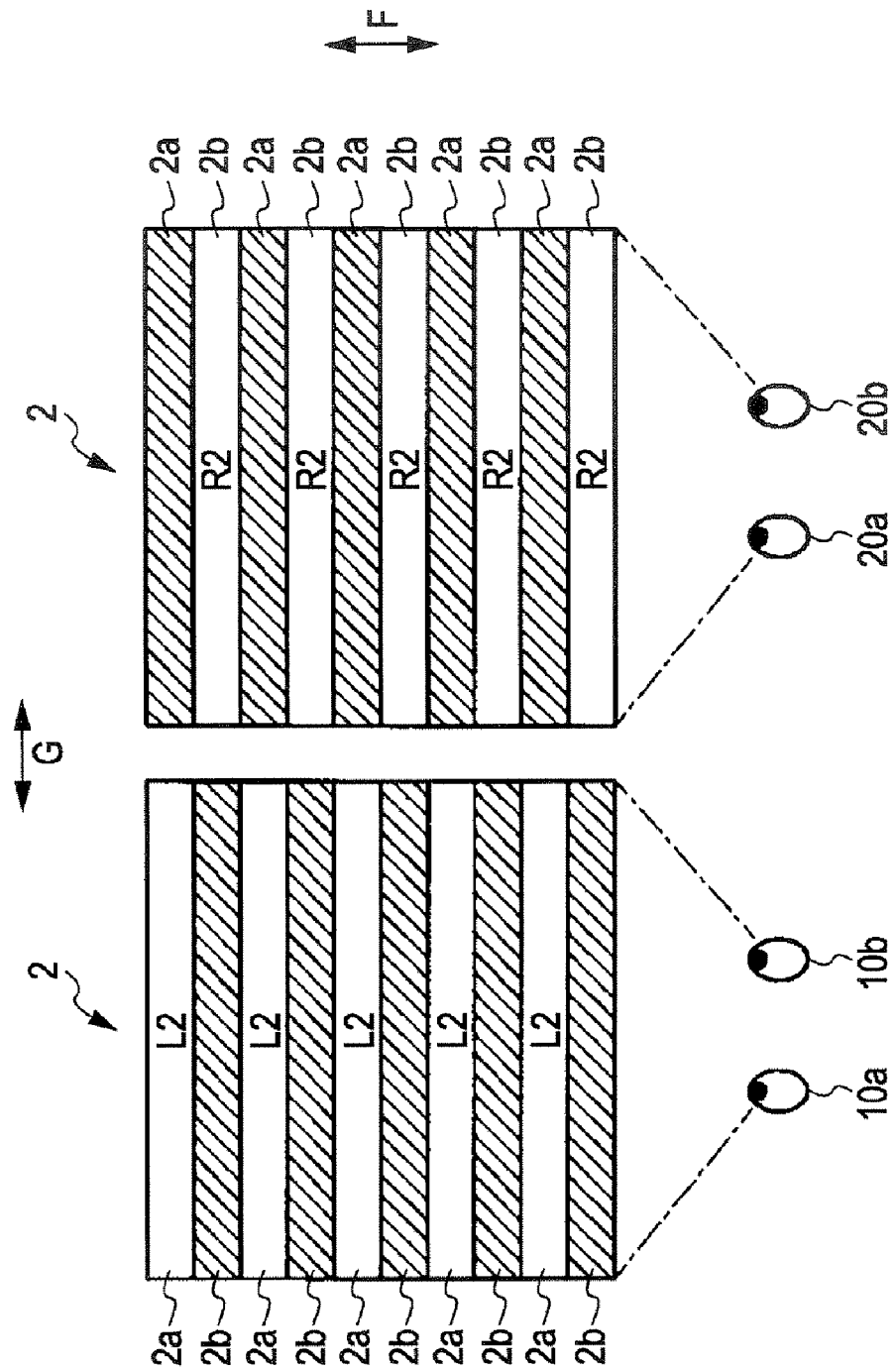
FIG. 6 is a drawing showing areas on the display panel observed by the observers in the two-screen display mode.

FIG. 6 is an explanatory drawing showing areas on the display panel observed by the observers when the image display apparatus 100 according to the first embodiment of the invention shown in FIG. 1 is in the two-screen display mode. Referring now to FIGS. 2 to 6, the two-screen display method of the image display apparatus 100 according to the first embodiment of the invention will be described.

FIGS. 2 and 5 show the configuration of the polarization controlling liquid crystal panel 7 and the display panel 2 for establishing the two-screen display mode, that is, for presenting different images to the observers 10 and 20 at the different observing positions. In the image display apparatus 100 in the two-screen display mode according to the first embodiment of the invention, as shown in FIGS. 2 and 3, the sets of polarization controlling areas 7a and 7b of the polarization controlling liquid crystal panel 7 are provided so that each set corresponds to one of the lens patterns 8a of the lenticular lens 8, and in the two-screen display mode, as described above, the plurality of electrodes 7d of the polarization controlling liquid crystal panel 7 are controlled so that the application and non-application of the voltage are switched alternately. As shown in FIG. 5, an image L2 (for example, images for a TV) to be viewed by the observer 10 is displayed in the pixel arrays 2a of the display panel 2, and an image R2 (for example, images for a car navigation system) to be viewed by the observer 20 is displayed in the pixel arrays 2b.

In the configuration shown above, only light rays having the first polarization axis of light irradiated from the back light 5 pass through the polarizing plate 6 arranged on the side of the observers 10 and 20 of the back light 5 and proceed toward the polarization controlling liquid crystal panel 7. The light rays having the first polarization axis pass through the polarization controlling areas 7a and 7b of the polarization controlling liquid crystal panel 7. In this case, the light rays entering the polarization controlling areas 7a of the polarization controlling liquid crystal panel 7 pass therethrough without having the polarization axes changed, while light rays entering the polarization controlling areas 7b of the polarization controlling liquid crystal panel 7 have their polarization axis changed substantially by 90° and are outputted (in the state having the second polarization axis). Subsequently, as shown in FIG. 2, the light rays outputted from the polarization controlling areas 7a in a state of having the first polarization axis are converged by the lenticular lens 8 so as to proceed toward the observer 10. The light rays outputted from the polarization controlling areas 7b in a state of having the second polarization axis are converted by the lenticular lens 8 being substantially orthogonal to the first polarization axis so as to proceed toward the observer 20.

Then, in the state of having the first polarization axis as shown in FIG. 5, the light rays proceeding toward the observer 10 enter into the wave plate 9 having the transmissive areas 9a and the polarizing areas 9b. Then, the light rays having the first polarization axis passes through the transmissive areas 9a and the polarizing areas 9b of the wave plate 9. In this case, the polarization axes of the light rays passing through the transmissive areas 9a of the wave plate 9 are not changed, and the polarization axes of the light rays passing through the polarizing areas 9b are changed substantially by 90° (into the state of having the second polarization axis) before being outputted. Then, the light rays proceeding toward the observer 10 which are outputted from the transmissive areas 9a of the wave plate 9 in a state of having the first polarization axis enter into the polarizing plate 4 arranged between the display panel 2 and the wave plate 9, pass through the polarizing plate 4 without being changed, and enter into the pixel arrays 2a of the display panel 2. In contrast, the light rays outputted from the transmissive areas 9b of the wave plate 9 in a state of having the second polarization axis substantially orthogonal to the first polarization axis and proceeding toward the observer 10 enter the polarizing plate 4 arranged between the display panel 2 and the wave plate 9 and are absorbed thereby. Therefore, since the light rays passing through the pixel arrays 2b of the display panel 2 on which the image R2 to be viewed by the observer 20 is displayed do not reach the observer 10, the observer 10 cannot view the image R2 to be viewed by the observer 20 displayed on the pixel arrays 2b of the display panel 2. Accordingly, the observer 10 can view the image L2 to be viewed by the observer 10 displayed on the pixel arrays 2a on the display panel 2.

Figure 7:
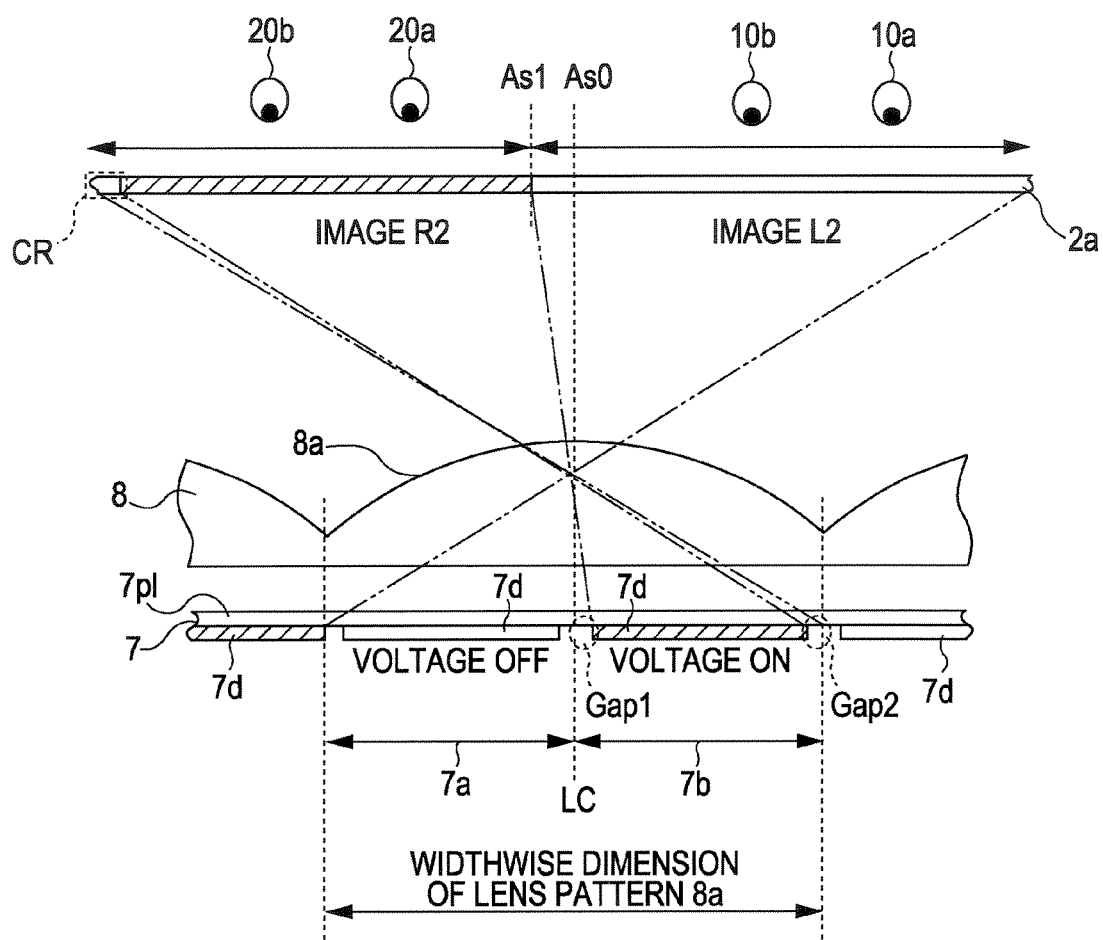
FIG. 7 illustrates the display panel in which all the electrodes are formed to have the same width, observed by the observer from above.
Figure 8:
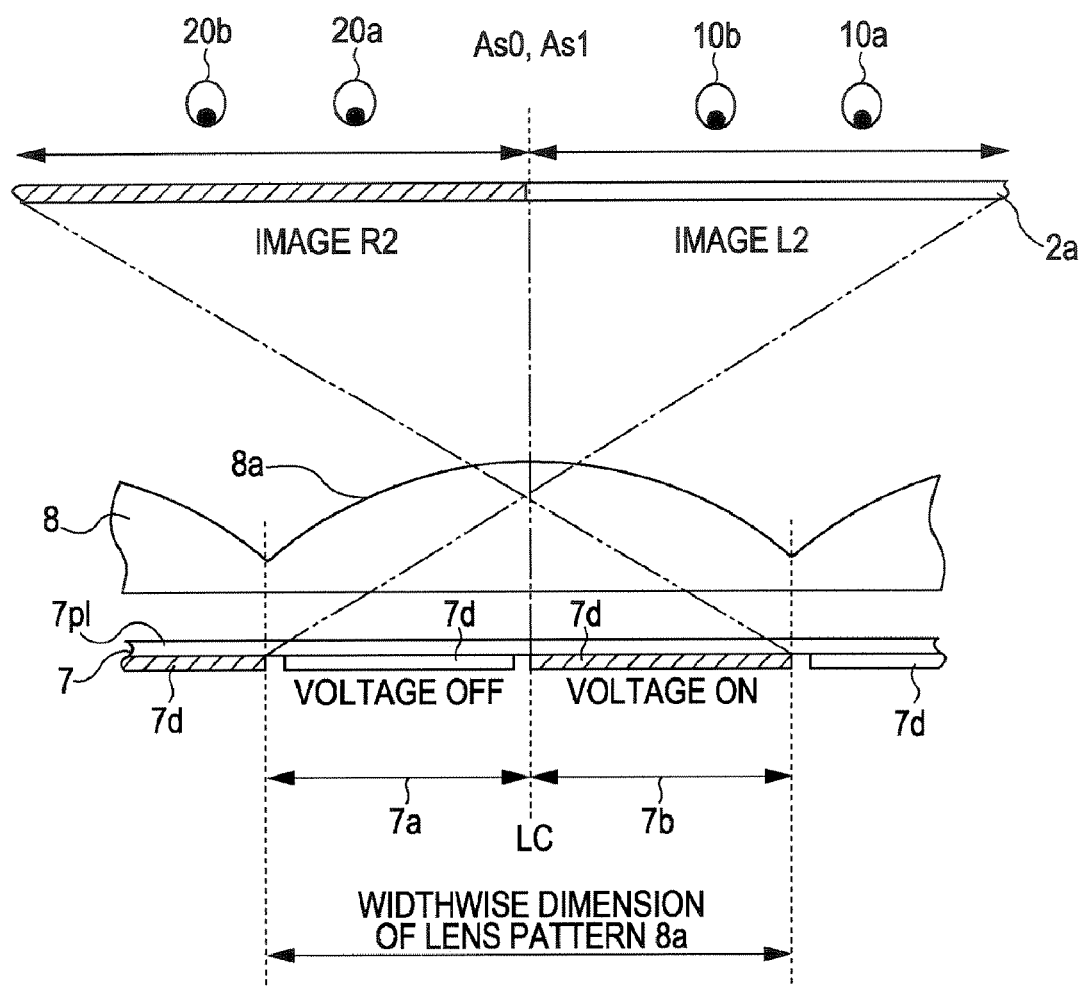
FIG. 8 illustrates the image display apparatus in which the width of the electrodes to which the voltage is applied is larger than the width of the electrodes to which no voltage is applied, observed by the observer from above.

The light rays proceeding toward the observer 20 in the state of having the second polarization axis enter the wave plate 9 having the transmissive areas 9a and the polarizing areas 9b as shown in FIG. 5. Then, the light rays having the second polarization axis substantially orthogonal to the first polarization axis pass through the transmissive areas 9a and the polarizing areas 9b of the wave plate 9. In this case, the polarization axes of the light rays passing through the transmissive areas 9a of the wave plate 9 are not changed, and the polarization axes of the light rays entering the polarizing areas 9b are changed substantially by 90° (into the state of having the first polarization axis) before being outputted. Then, the light rays outputted from the transmissive areas 9a of the wave plate 9 in a state of having the second polarization axis which is substantially orthogonal to the first polarization axis and proceeding toward the observer 20 enter the polarizing plate 4 arranged between the display panel 2 and the wave plate 9 and are absorbed thereby. Therefore, since the light rays passing through the pixel arrays 2a of the display panel 2 on which the image L2 to be viewed by the observer 10 is displayed do not reach the observer 20, the observer 20 cannot view image L2 to be viewed by the observer 10 displayed on the pixel arrays 2a of the display panel 2. In contrast, the light rays outputted from the polarizing areas 9b of the wave plate 9 in the state of having the first polarization axis and proceeding toward the observer 20 enter the polarizing plate 4 arranged between the display panel 2 and the wave plate 9, pass through the polarizing plate 4 without being changed, and enter the pixel arrays 2b of the display panel 2. Accordingly, the observer 20 can view the image R2 to be viewed by the observer 20 displayed on the pixel arrays 2b of the display panel 2. Width of Electrode and Occurrence of Cross-talk Subsequently, a relationship between the width of the electrodes 7d of the polarization controlling liquid crystal panel 7 and the display range of the image L2 and the image R2 in the first embodiment will be described. FIGS. 7 and 8 are partly enlarged drawings showing states in which the observers view the image display apparatus 100 from above for explaining the principle of the image display apparatus 100 according to the first embodiment, in which a lens pattern of the lenticular lens is enlarged. FIG. 7 shows a case in which all the electrodes 7d are formed to have the same width, and FIG. 8 shows a case in which the width of the electrodes 7d to which the voltage is applied is larger than the width of the electrodes 7d to which no voltage is applied. In the image display apparatus 100 shown in FIGS. 7 and 8, only the lenticular lens 8, the polarization controlling panel 7 and the display screen 2a of the display panel 2 are shown, and other configurations are omitted. In FIGS. 7 and 8, the polarization controlling panel 7 is formed with the electrodes 7d in the stripe pattern on a substrate 7pl on the light-output side, and in the drawing, only the substrate 7pl and the electrodes 7d are shown. The electrodes 7d to which the voltage is applied are hatched, and marked as "VOLTAGE ON" and the electrodes 7d to which no voltage is applied are marked as "VOLTAGE OFF".

Referring now to FIG. 7, the display range of the image L2 and the image R2 in the case in which all the electrodes 7d are formed to have the same widths will be described.

In the polarization controlling area 7a, no voltage is applied to the electrode 7d, and the alignment of the liquid crystal in the area corresponding to the polarization controlling area 7a does not change. Accordingly, light rays entering the polarization controlling area 7a are outputted as is without being polarized. On the other hand, in the polarization controlling area 7b, the voltage is applied to the electrode 7d, and hence the alignment of the liquid crystal in the area corresponding to the polarization controlling area 7b changes. Accordingly, the light rays entering the polarization controlling area 7b are polarized before being outputted.

The light rays outputted from the polarization controlling area 7a in the state of having the first polarization axis are converged by the lenticular lens 8 so as to proceed toward the observer 10. The light rays outputted from the polarization controlling area 7b in the state of having the second polarization axis which is substantially orthogonal to the first polarization axis are converged by the lenticular lens 8 so as to proceed toward the observer 20. Through the light rays outputted from the polarization controlling area 7a being passing through the wave plate 9 and the display panel 2, the image L2 is displayed on the display screen 2a that the observer 10 observes. Through the light rays outputted from the polarization controlling area 7b being passing through the wave plate 9 and the display panel 2, the image R2 is displayed on the display screen 2a that the observer 20 observes.

The sets of the polarization controlling areas 7a and 7b of the polarization controlling liquid crystal panel 7 each are provided corresponding to the respective lens patterns 8a of the lenticular lens 8. More specifically, the polarization controlling areas 7a and 7b are provided so as to abut at the center LC of the lens pattern 8a thereby each occupying half the width of the lens pattern 8a. The electrodes 7d in the polarization controlling areas 7a and 7b are arranged at a certain distance so as to prevent the electrodes adjacent to each other from electrically short-circuiting. Therefore, in FIG. 7, the width of the electrodes 7d is smaller than the width of the polarization controlling areas 7a and 7b. That is, the electrodes 7d are formed so as to have a width smaller than half the width of the lens pattern 8a. In FIG. 7, the area between an edge of the electrode 7d to which the voltage is applied and the center LC of the lens pattern 8a is designated as Gap 1, and the area between the edge of the electrode 7d to which the voltage is applied and the edge of the lens pattern 8a is designated as Gap 2.

Therefore, specially, when the voltage is applied to the electrode 7d in the polarization controlling areas 7b, the alignment of the liquid crystal is not changed entirely over the polarization controlling area 7b, but the alignment of the liquid crystal only in the area corresponding to the electrode 7d is changed. That is, the alignment of the liquid crystal of the area which is included in the area of the polarization controlling area 7b, but not included in the area of the electrode 7d to which the voltage is applied is not changed.

Therefore, the light rays entering the area of the electrodes 7d to which the voltage is applied from among the light rays entering the polarization controlling areas 7b are polarized, but the light rays entering the areas of Gap 1 and Gap 2, that is, the areas other than the areas of the electrodes 7d to which the voltage is applied, are not polarized. That is, the light rays in the state of having the first polarization axis are outputted not only from the polarization controlling area 7a, but also from the areas of Gap 1 and Gap 2 in the polarization controlling area 7b, whereby the light rays in the state of having the second polarization axis are outputted only from the areas of the electrodes 7d to which the voltage is applied, which are narrower than the polarization controlling areas 7b.

Since light rays having the first polarization axis are outputted from the area of Gap 1, the boundary As1 between the display range in which the image L2 is displayed and the display range in which the image R2 is displayed is shifted from the center As0 of the display screen 2a as shown in FIG. 7. Likewise, since the light rays having the first polarization axis are outputted from the area of Gap 2, an area CR in which the image L2 is displayed (hereinafter, such an area is referred to as "cross-talk area") in the display range where the image R2 is supposed to be displayed is generated as shown in FIG. 7. That is, the image which is to be presented to one observer goes partly into the observation area of the other observer.

Therefore, in the image display apparatus 100 according to the first embodiment of the invention, the polarization controlling liquid crystal panel 7 has a structure of the electrodes 7d as shown in FIG. 8. In the image display apparatus 100 according to the first embodiment of the invention, the width of the electrodes 7d to which the voltage is applied includes the areas of Gap 1 and Gap 2 in the polarization controlling areas 7b. That is, the width of the electrodes 7d to which the voltage is applied matches the width of the polarization controlling area 7b. That is, the electrodes 7d to which the voltage is applied are formed so as to have a width which corresponds to half the width of the lens pattern 8a. In this configuration, the alignment of the liquid crystal over the entire polarization controlling area 7b can be changed, and hence the light rays entering the polarization controlling area 7b are polarized. Even though the width of the electrodes 7d to which the voltage is applied are formed so as to be half the width of the lens pattern 8a, there remains a certain distance between the electrodes 7d to which the voltage is applied and the electrodes 7d to which no voltage is applied, and hence there is no possibility of short circuit.

Figure 9:
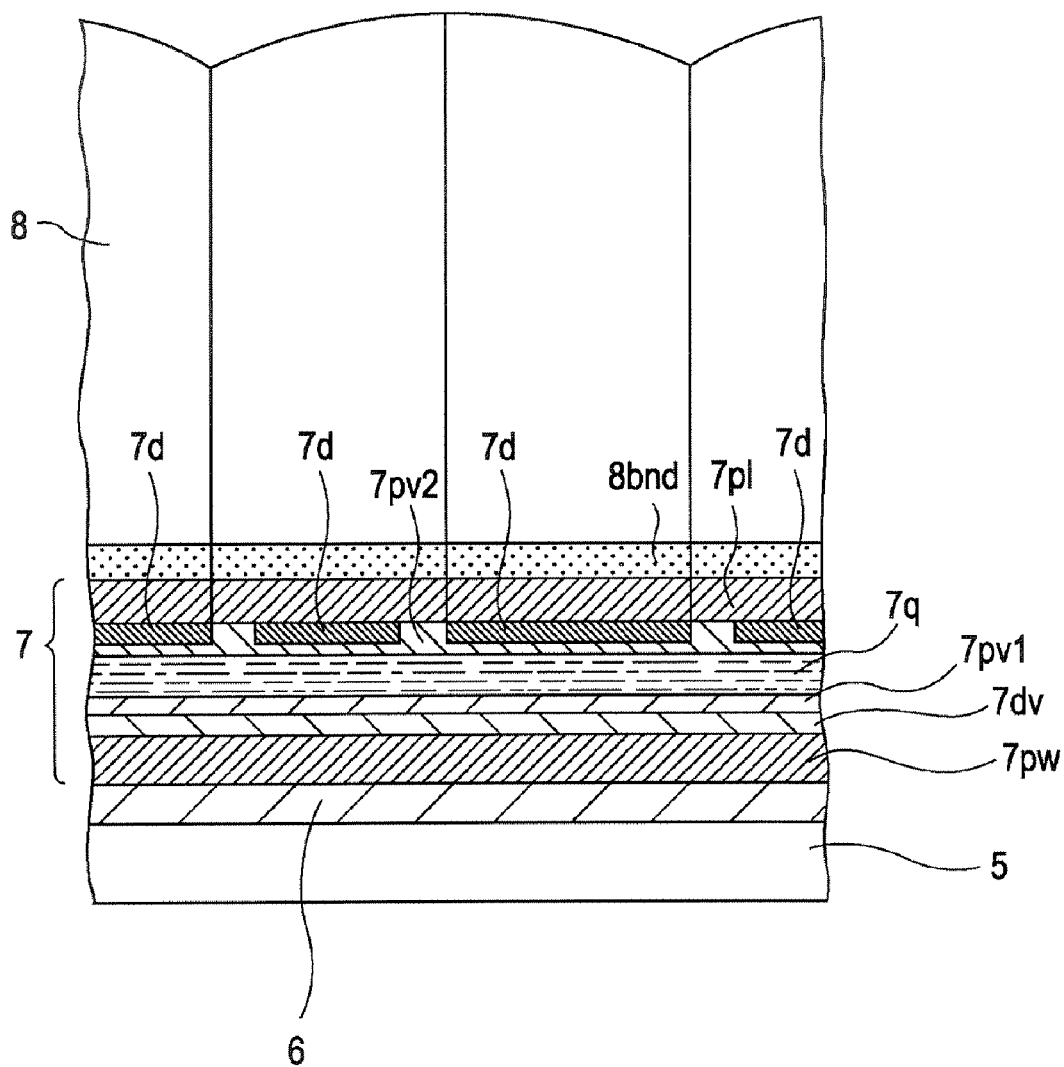
FIG. 9 illustrates a cross-sectional structure of the image display apparatus according to the first embodiment.

Referring now to FIG. 9, a cross-sectional structure of the image display apparatus 100 according to the first embodiment, in particular, the cross-sectional structure of the polarization controlling liquid crystal panel 7 will be described in more detail. FIG. 9 is a cross-sectional view showing the detailed structure of the image display apparatus 100 according to the first embodiment. The polarization controlling liquid crystal panel 7 is installed between the lenticular lens 8 and the polarizing plate 6 as shown in FIG. 9, and is bonded to the lenticular lens 8 with a transparent bonding agent 8bnd. The polarization controlling liquid crystal panel 7 includes a liquid crystal layer 7q held between the substrate 7pl on the light-output side, and a substrate 7pw on the light-incident side. The substrate 7pl on the light-output side is provided with electrodes 7d on the inner surface thereof in the stripe pattern, and is provided with an alignment layer 7pv2 formed on the entire area thereof. The substrate 7pw on the light-incident side is provided with the electrode 7d v entirely over the inner surface thereof, and is provided with an alignment layer 7pv1 over the entire surface thereof.

More specifically, the width of the lens pattern 8a is set to 500 to 700 μm, and the distance between the electrode 7d to which the voltage is applied and the electrode 7d to which no voltage is applied is set to 5 to 20 μm. Here, the widths of the electrodes of the electrodes 7d to which the voltage is applied and the electrodes 7d to which no voltage is applied are determined by the distance between the electrode 7d to which the voltage is applied and the electrode 7d to which no voltage is applied. For example, when the width of the lens pattern 8a is set to 600 μm and the distance between the electrodes 7d to which the voltage is applied and the electrodes 7d to which no voltage is applied is set to 20 μm, the width of each of the electrodes 7d to which the voltage is applied is 300 μm, and the width of each of the electrodes 7d to which no voltage is applied is 280 μm.

As described above, although the width of the each of electrodes 7d to which the voltage is applied is formed to be half that of the lens pattern 8a, it is not limited to the case in which the electrodes 7d are each formed to have exactly half the width of the lens pattern 8a, but includes a case in which they are each formed to have a width which can achieve a substantially equivalent effect.

In this configuration, in the image display apparatus 100 according to the fist embodiment, the areas of Gap 1 and Gap 2 that allows the light rays in the state of having the first polarization axis to be outputted therethrough can be eliminated, so that the boundary As1 between the display range in which the image L2 is displayed and the display range in which the image R2 is displayed can be aligned with the center As0 of the display screen 2a as shown in FIG. 8, and the cross-talk area CR shown in FIG. 7 can be eliminated.

In this manner, in the polarization controlling liquid crystal panel in which the width of the electrodes 7d to which the voltage is applied is larger than the width of the electrodes 7d to which no voltage is applied, it is understood that the area for outputting the light rays in the state of having the second polarization axis can be expanded in comparison with the polarization controlling liquid crystal panel in which the width of the electrodes 7d to which the voltage is applied and the width of the electrodes 7d to which no voltage is applied are the same, so that the areas of Gap 1 and Gap 2 that allow the light rays in the state of having the first polarization axis to be outputted therethrough can be reduced. Accordingly, when presenting different images to the observers at different observing positions in the two-screen display mode, the boundary between the respective images is prevented from being shifted from the center of the display screen, that is, the position of the boundary between the observation ranges of the observers at different observing positions can be prevented from being shifted from the center of the display screen. Simultaneously, intermixing of the image to be presented to one of the observers with that to be presented to the other observer is prevented.

In this arrangement, the output direction of the light rays having the first polarization axis and the light rays having the second polarization axis from the polarization axis controlling unit can be adjusted appropriately, and hence the quality of display can be adjusted appropriately.

Second Embodiment

Figure 10:
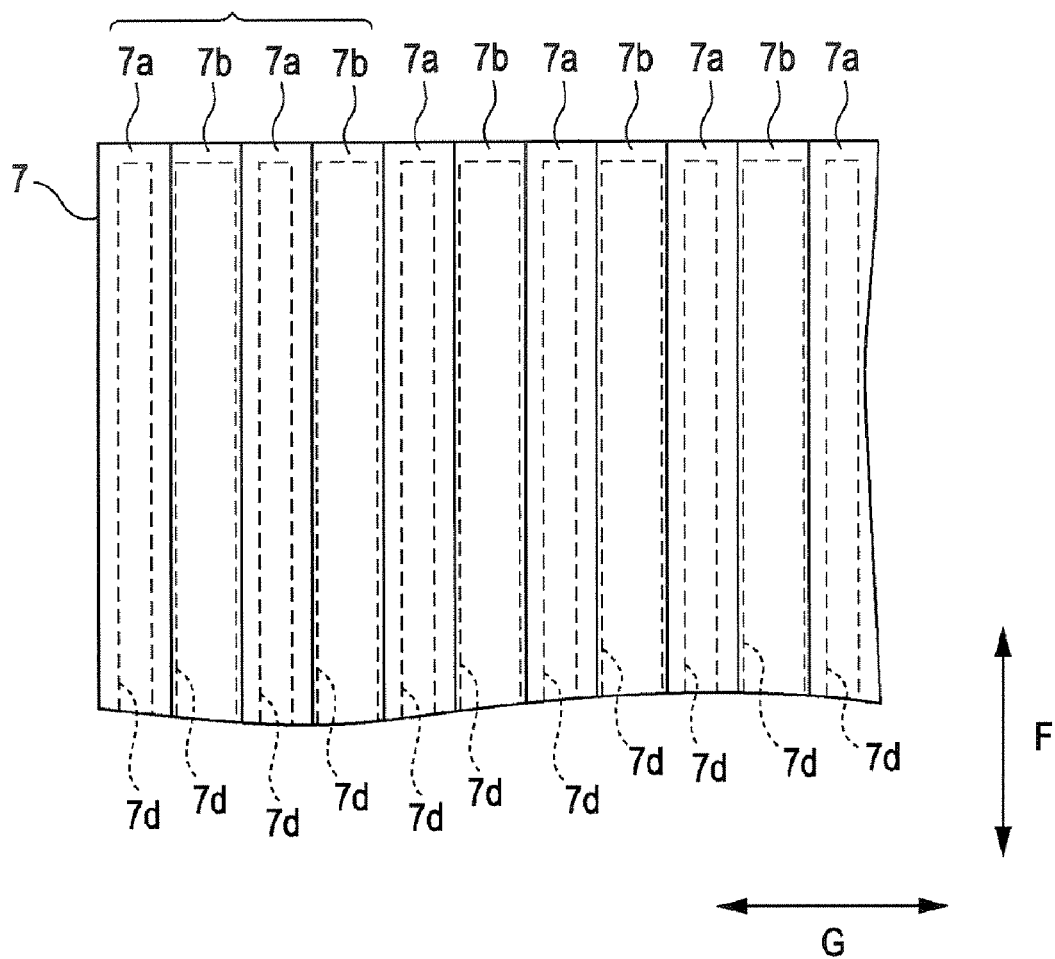
FIG. 10 is a partial enlarged drawing of a polarization controlling liquid crystal panel of the image display device according to a second embodiment.

Subsequently, the image display apparatus 100 according to a second embodiment of the invention will be described. The image display apparatus 100 according to the second embodiment achieves stereoscopic image display that presents three-dimensional stereoscopic image. The configuration of the image display apparatus 100 according to the second embodiment is almost the same as the configuration of the image display apparatus 100 according to the first embodiment. However, the structure of the polarization controlling area 7a and the polarization controlling area 7b in the polarization controlling liquid crystal panel 7 is different. That is, the structure of the polarization controlling liquid crystal panel in the image display apparatus 100 according to the second embodiment has a different structure from the structure shown in FIG. 3. FIG. 10 is a partially enlarged view of the polarization controlling liquid crystal panel according to the image display apparatus 100 according to the second embodiment of the invention shown in FIG. 1. In the image display apparatus 100 according to the first embodiment, the sets of the polarization controlling areas 7a and 7b of the polarization controlling liquid crystal panel 7 are provided so that each set corresponds to each one of the lens patterns 8a of the lenticular lens 8. On the other hand, in the image display apparatus 100 according to the second embodiment, the sets of the polarization controlling areas 7a and 7b are provided so that two sets each correspond to each one of the lens patterns 8a of the lenticular lens 8.

In the second embodiment as well, the voltage is applied to the electrodes 7d for the polarization controlling areas 7b, and no voltage is applied to the electrodes 7d for the polarization controlling areas 7a. That is, the plurality of electrodes 7d in the polarization controlling liquid crystal panel 7 are controlled so that presence and absence of a voltage applied thereto are switched alternately as in the first embodiment.

As described later in detail, as shown in FIG. 10, in the second embodiment as well, the width of the electrodes 7d of the polarization controlling areas 7b to which the voltage is applied is formed to be larger than the width of the electrodes 7d of the polarization controlling areas 7a to which no voltage is applied in the polarization controlling liquid crystal panel 7. In this configuration, the direction of output of the light rays having the first polarization axis and the light rays having the second polarization axis from the polarization axis controlling unit can be adjusted appropriately, so that the display quality can be adjusted appropriately.

In the image display apparatus 100 according to the second embodiment as well, a plain image display mode and a stereoscopic image display mode can be switched by controlling the presence and absence of a voltage applied to the electrodes 7d. More specifically, in the plane image display mode, the voltage is applied to both of or none of the electrodes 7d of the polarization controlling areas 7a and the electrodes 7d of the polarization controlling areas 7b.

Stereoscopic Image Display Mode

Figure 11:
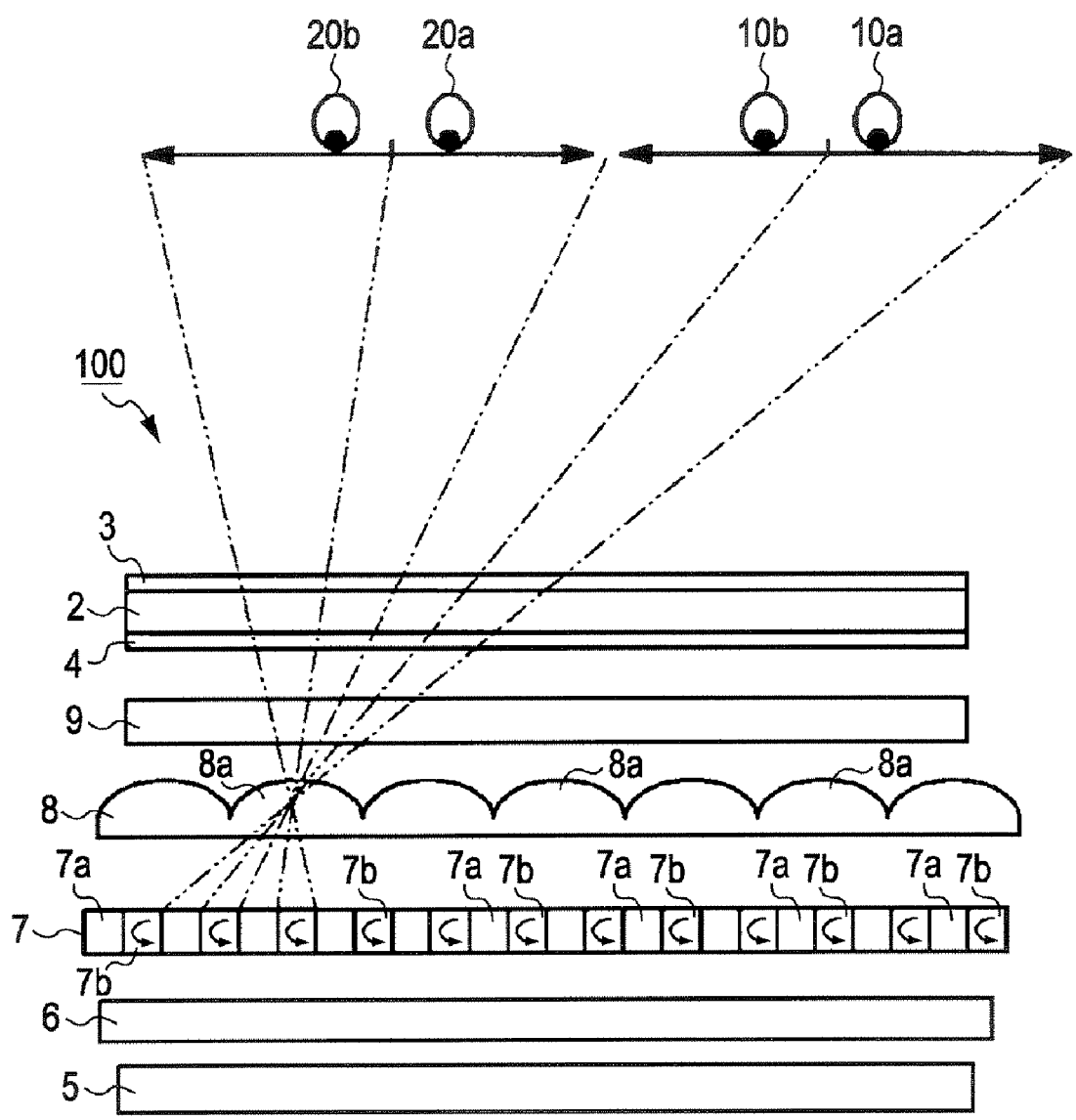
FIG. 11 is a drawing showing a state of the image display apparatus viewed by the observers from above.
Figure 12:
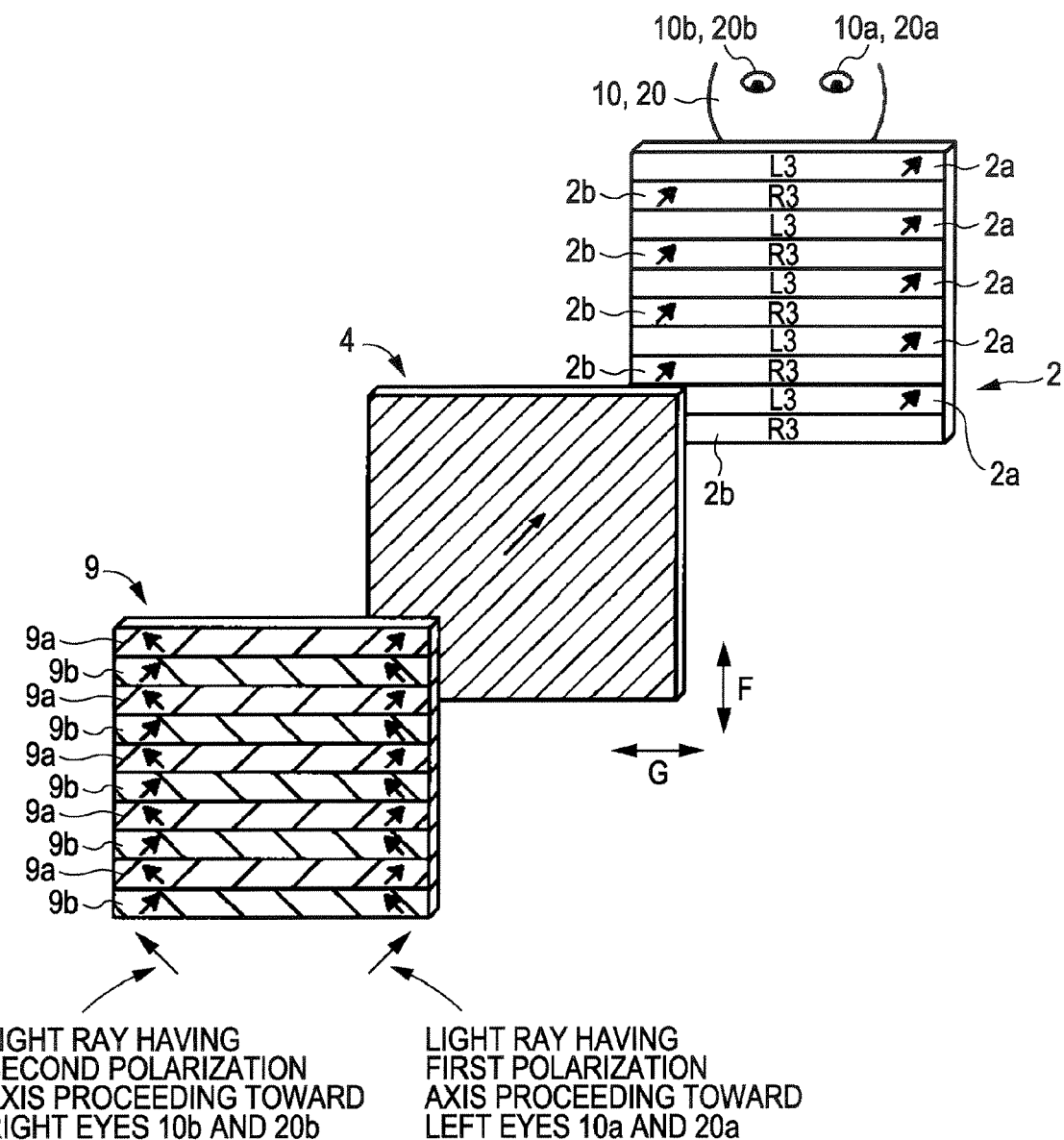
FIG. 12 is an exploded perspective view for explaining a principle of the stereoscopic image display method.
Figure 13:
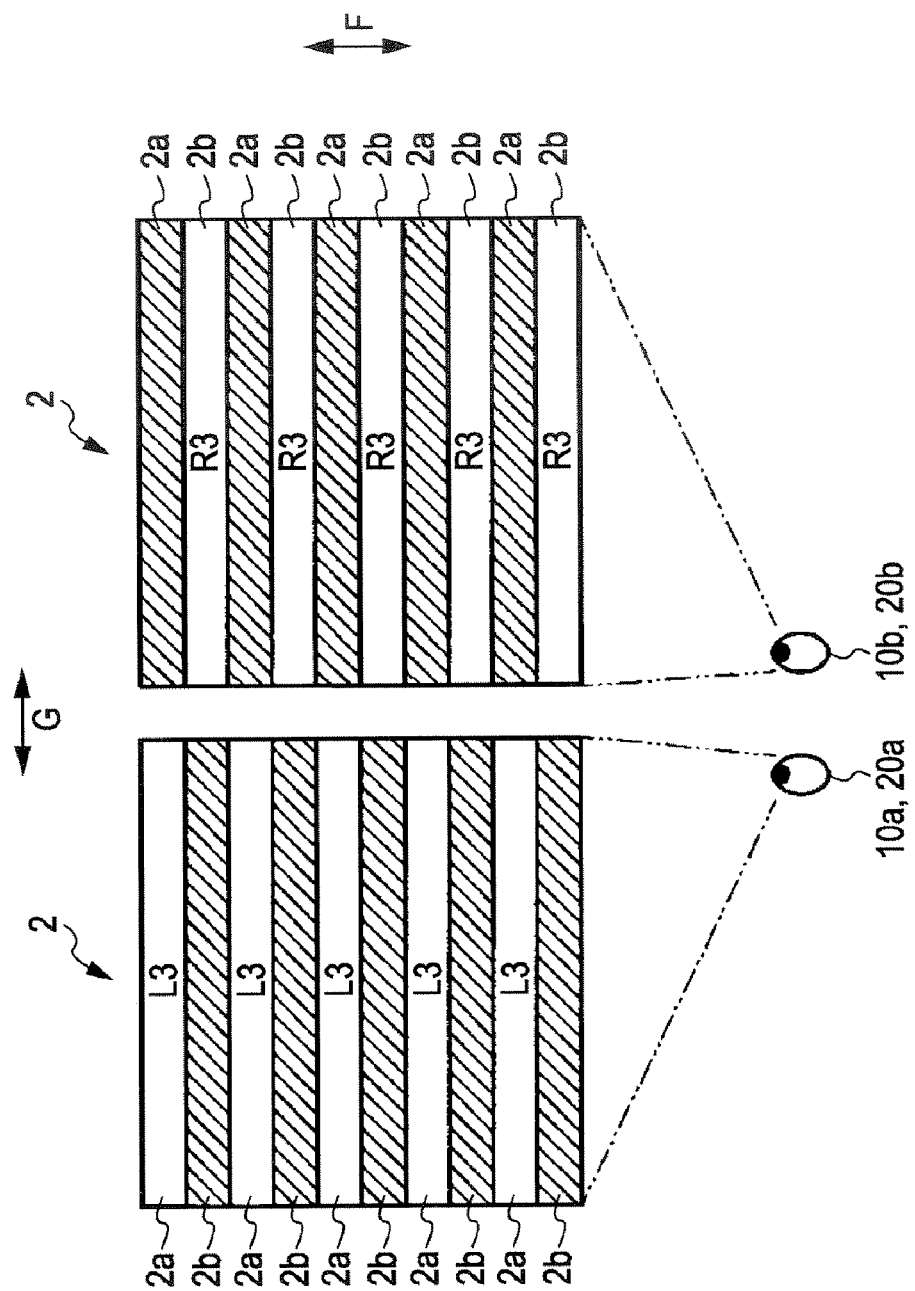
FIG. 13 is a drawing showing areas of display panels viewed by the observers in the stereoscopic image display mode.

FIG. 11 is an explanatory drawing showing a principle of the image display apparatus 100 according to the second embodiment of the invention in a state in which the observers view the image display apparatus 100 from above. FIG. 12 is an exploded perspective view showing a principle of the stereoscopic image display method of the image display apparatus 100 according to the second embodiment of the invention. FIG. 13 is an explanatory drawing showing an area of the display panel to be observed by the observer in the stereoscopic image display mode of the image display apparatus 100 according to the second embodiment of the invention. Referring now to FIGS. 11 to 13, a stereoscopic image display method of the image display apparatus 100 according to the first embodiment of the invention will be described.

Firstly, a configuration of the polarization controlling liquid crystal panel 7 and the display panel 2 for presenting a stereoscopic image to the observers 10 and 20 at different observing positions will be described. As shown in FIGS. 10 and 11, the sets of the polarization controlling areas 7a and 7b for the polarization controlling liquid crystal panel 7 are provided so that two sets each correspond to each one of the lens patterns 8a of the lenticular lens 8. As shown in FIG. 12, an image for the left eye L3 to be entering the left eyes 10a and 20a of the observers 10 and 20 is displayed on the pixel arrays 2a of the display panel 2, and an image for the right eye R3 to be entering the right eyes 10b and 20b of the observers 10 and 20 is displayed on the pixel arrays 2b.

In the configuration described above, only light rays having the first polarization axis of light irradiated from the back light 5 pass through the polarizing plate 6 arranged on the side of the observers 10 and 20 of the back light 5 and proceed toward the polarization controlling liquid crystal panel 7. The light rays having the first polarization axis pass through the polarization controlling areas 7a and 7b of the polarization controlling liquid crystal panel 7. In this case, the light rays entering the polarization controlling areas 7a of the polarization controlling liquid crystal panel 7 pass therethrough without being changed the polarization axes thereof, while the polarization axes of the light rays entering the polarization controlling areas 7b of the polarization controlling liquid crystal panel 7 are changed substantially by 90° and outputted (in the state having the second polarizing axis). Subsequently, the light rays outputted from the polarization controlling areas 7a in a state having the first polarization axis are converged by the lenticular lens 8 so as to proceed toward the left eyes 10a and 20a of the observers 10 and 20. Light rays outputted from the polarization controlling areas 7b in the state of having the second polarization axis substantially orthogonal to the first polarization axis are converged by the lenticular lens 8 so as to proceed toward the right eyes 10b and 20b of the observers 10 and 20.

As shown in FIG. 12, in the state of having the first polarization axis, the light rays proceeding toward the left eyes 10a and 20a of the observers 10 and 20 enter the wave plate 9 having the transmissive area 9a and the polarizing area 9b. The light rays having the first polarization axis pass through the transmissive area 9a and the polarizing areas 9b of the wave plate 9. In this case, the polarization axes of the light rays passing through the transmissive areas 9a of the wave plate 9 are not changed, and the polarization axes of the light rays passing through the polarizing areas 9b are changed substantially by 90° (into the state of having the second polarization axis) before being outputted. Then, the light rays proceeding toward the left eyes 10a and 20a of the observers 10 and 20 which are outputted from the transmissive areas 9a of the wave plate 9 in the state of having the first polarization axis enter into the polarizing plate 4 arranged between the display panel 2 and the wave plate 9, pass through the polarizing plate 4 without being changed, and enter into the pixel arrays 2a of the display panel 2. In contrast, the light rays outputted from the transmissive areas 9b of the wave plate 9 in a state of having the second polarization axis substantially orthogonal to the first polarization axis and proceeding toward the left eyes 10a and 20a of the observers 10 and 20 enter the polarizing plate 4 arranged between the display panel 2 and the wave plate 9 and are absorbed thereby. Therefore, since the light rays passing through the pixel arrays 2b of the display panel 2 on which the image R3 for the right eye do not reach the left eyes 10a and 20a of the observers 10 and 20, the left eyes 10a and 20a of the observers 10 and 20 cannot view the image R3 for the right eye displayed on the pixel arrays 2b of the display panel 2. Accordingly, the image L3 for the left eye displayed on the pixel arrays 2a of the display panel 2 is entering the left eyes 10a and 20a of the observers 10 and 20 as shown in FIG. 13.

The light rays proceeding toward the right eyes 10b and 20b of the observers 10 and 20 in the state of having the second polarization axis enters the wave plate 9 having the transmissive areas 9a and the polarizing areas 9b as shown in FIG. 12. Then, the light rays having the second polarization axis pass through the transmissive areas 9a and the polarizing areas 9b of the wave plate 9. In this case, the polarization axes of the light rays passing through the transmissive areas 9a of the wave plate 9 are not changed, and the polarization axes of the light rays passing through the polarizing areas 9b are changed substantially by 90° (into the state of having the first polarization axis) before being outputted. Then, the light rays outputted from the transmissive areas 9a of the wave plate 9 in a state of having the second polarization axis and proceeding toward the right eyes 10b and 20b of the observers 10 and 20 enter the polarizing plate 4 arranged between the display panel 2 and the wave plate 9 and are absorbed thereby. Therefore, since the light rays passing through the pixel arrays 2a of the display panel 2 on which the image L3 for the left eye is displayed do not reach the right eyes 10b and 20b of the observers 10 and 20, the right eyes 10b and 20b of the observers 10 and 20 cannot view image L3 for the left eye displayed on the pixel arrays 2a of the display panel 2. In contrast, the light rays outputted from the polarizing areas 9b of the wave plate 9 in the state of having the first polarization axis and proceeding toward the right eyes 10b and 20b of the observers 10 and 20 enter the polarizing plate 4 arranged between the display panel 2 and the wave plate 9, pass through the polarizing plate 4, and enter the pixel arrays 2b of the display panel 2. Accordingly, the image R3 for the right eye displayed on the pixel arrays 2b of the display panel 2 is entering the right eyes 10b and 20b of the observers 10 and 20 as shown in FIG. 13. As described above, the observers 10 and 20 can view the stereoscopic image by the image for the left eye L3 and the image for the right eye R3 having binocular parallax entered respectively to the left eye and the right eye of the observers 10 and 20.

Width of the Electrode and Occurrence of Cross-talk

Figure 14:
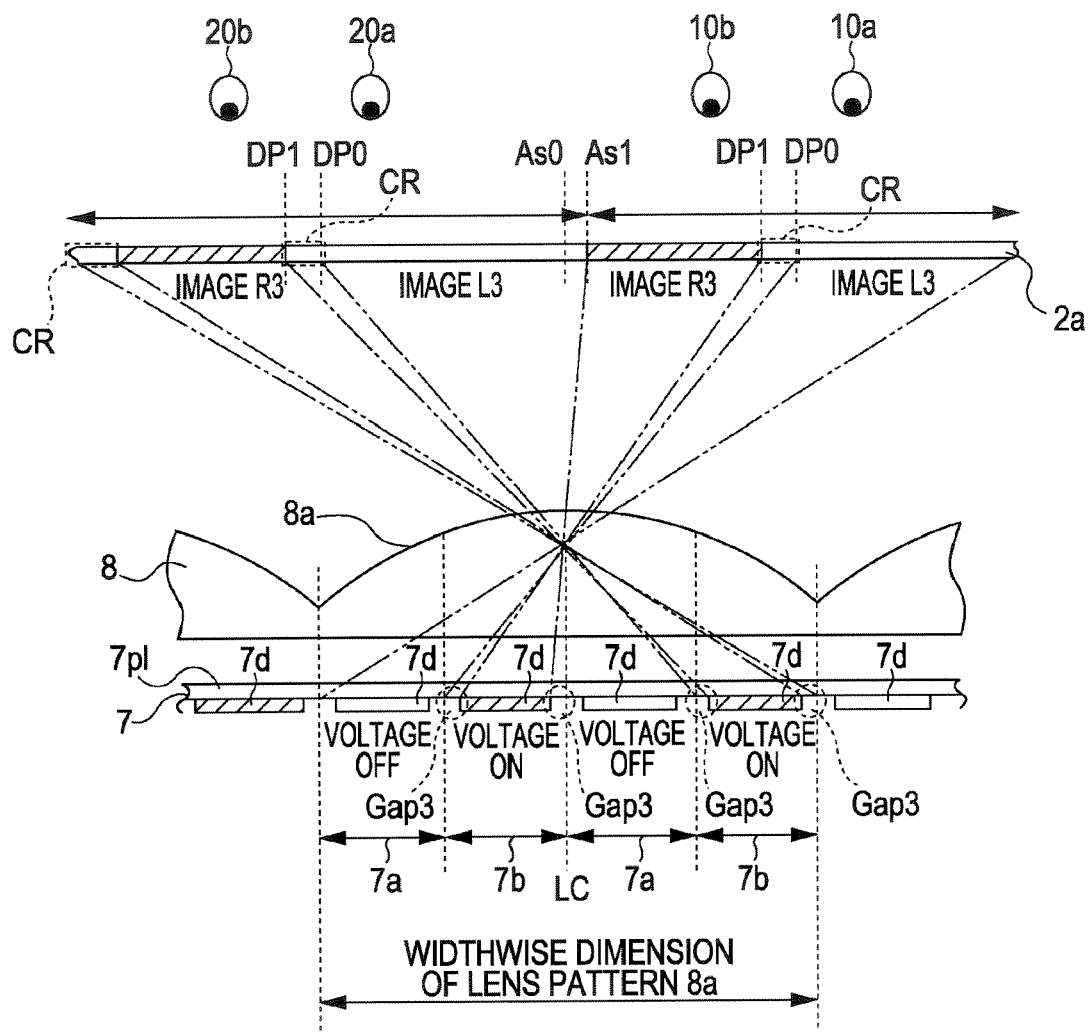
FIG. 14 is a drawing showing a state in which the image display apparatus is viewed by the observers in a case in which all the electrodes are formed to have the same width.
Figure 15:
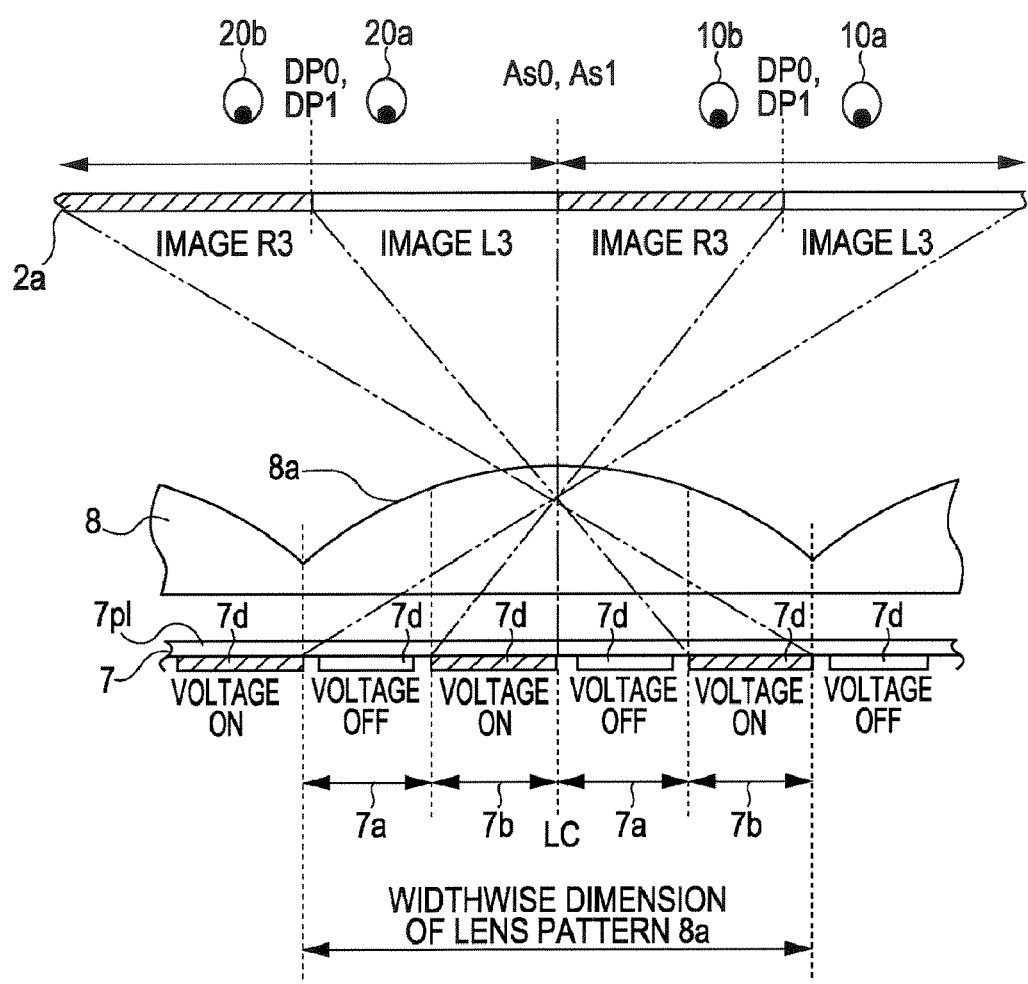
FIG. 15 illustrates a state in which the image display apparatus in which the width of the electrodes to which the voltage is applied is larger than the width of the electrodes to which no voltage is applied, observed by the observers from above.

Subsequently, a relation between the width of the electrodes 7d of the polarization controlling liquid crystal panel 7 and the display range of the image L3 and the image R3 in the second embodiment will be described. FIGS. 14 and 15 are partly enlarged drawing showing states in which the observers view the image display apparatus 100 from above for explaining the principle of the image display apparatus 100 according to the second embodiment, in which a lens pattern of the lenticular lens is enlarged. FIG. 14 shows a case in which all the electrodes 7d are formed to have the same width, and FIG. 15 shows a case in which the width of the electrodes 7d to which the voltage is applied is larger than the width of the electrodes 7d to which no voltage is applied. In the image display apparatus 100 shown in FIGS. 14 and 15, only the lenticular lens 8, the polarization controlling panel 7 and the display screen 2a of the display panel 2 are shown, and other configurations are omitted. In the polarization controlling panel 7, only the electrodes 7d of the substrate 7pl on the light-output side is shown. The electrodes 7d to which the voltage is applied are hatched, and marked as "VOLTAGE ON" and the electrodes 7d to which no voltage is applied are marked as "VOLTAGE OFF".

Referring now to FIG. 14, the display range of the image L3 and the image R3 in the case in which all the electrodes 7d are formed to have the same widths will be described.

In the polarization controlling area 7a, no voltage is applied to the electrode 7d, and the alignment of the liquid crystal in the area corresponding to the polarization controlling area 7a does not change. Accordingly, a light rays entering the polarization controlling area 7a are outputted as is without being polarized. On the other hand, in the polarization controlling area 7b the voltage is applied to the electrode 7d, and hence the alignment of the liquid crystal in the area corresponding to the polarization controlling area 7b changes. Accordingly, the light rays entering the polarization controlling area 7b are polarized before being outputted.

As described above, the light rays outputted from the polarization controlling area 7a in the state of having the first polarization axis is converged by the lenticular lens 8 so as to proceed toward the left eyes 10a and 20a of the observers 10 and 20. The light rays outputted from the polarization controlling area 7b in the state of having the second polarization axis which is substantially orthogonal to the first polarization axis are converged by the lenticular lens 8 so as to proceed toward the right eyes 10b and 20b of the observers 10 and 20. By the light rays outputted from the polarization controlling area 7a being passing through the wave plate 9 and the display panel 2, the image L3 is displayed on the display screen 2a that the left eyes 10a and 20a of the observers 10 and 20 observe. By the light rays outputted from the polarization controlling area 7b being passing through the wave plate 9 and the display panel 2, the image R3 is displayed on the display screen 2a that the right eyes 10b and 20b of the observers 10 and 20 observes.

The sets of the polarization controlling areas 7a and 7b of the polarization controlling liquid crystal panel 7 are provided so that two sets each correspond to the respective lens patterns 8a of the lenticular lens 8. More specifically, the polarization controlling areas 7a and 7b are provided so as to abut at the center LC of the lens pattern 8a thereby each occupying a half the width of the lens pattern 8a. The polarization controlling areas 7a and 7b are provided so as to each occupy half the half of the width of the lens pattern 8a. That is, the polarization controlling areas 7a and the polarization controlling areas 7b each have a width one-fourth the width of the lens pattern 8a.

The electrodes 7d in the polarization controlling areas 7a and 7b are arranged at a certain distance so as to avoid the electrodes adjacent to each other from electrically short-circuiting. Therefore, in FIG. 14, the width of the electrodes 7d is smaller than the width of the polarization controlling areas 7a and 7b. That is, the electrodes 7d are formed to have a width smaller than one-fourth the width of the lens pattern 8a. In FIG. 14, the area of a gap formed between one electrode 7d and one area in the case in which the width of the lens pattern 8a is divided into 4 is shown as gap Gap 3.

Therefore, accurately, when the voltage is applied to the electrode 7d in the polarization controlling areas 7b, the alignment of the liquid crystal is not changed entirely over the polarization controlling area 7b, but the alignment of the liquid crystal only in the area corresponding to the electrode 7d is changed. That is, the alignment of the liquid crystal of the area which is included in the area of the polarization controlling area 7b, but not included in the area of the electrode 7d to which the voltage is applied is not changed.

Therefore, the light rays entering the area of the electrodes 7d to which the voltage is applied out of the light rays entering the polarization controlling areas 7b are polarized, but the light rays entering the areas of gaps Gap 3 are not polarized. That is, the light rays in the state of having the first polarization axis are outputted not only from the polarization controlling area 7a, but also from the areas of Gap 3 in the polarization controlling area 7b, whereby the light rays in the state of having the second polarization axis are outputted only from the areas of the electrodes 7d to which the voltage is applied, which are narrower than the polarization controlling areas 7b.

Since light rays having the first polarization axis are outputted from the area of Gap 3, the boundary As1 of the display screen 2a between two display ranges in which the stereoscopic images are respectively displayed is shifted from the center As0 of the display screen 2a.

Likewise, since the light rays having the first polarization axis are outputted from the area of Gap 3, an area CR in which the image L3 is displayed in the display range where the image R3 is supposed to be displayed is generated.

In FIG. 14, the positions on the display screen 2a which are to be positioned in the middle of the both eyes of the observers respectively for viewing the stereoscopic display image are designated as stereoscopic display points DP1. The stereoscopic display points DP1 are also shifted from the center positions DP0 of the two respective display ranges on which the stereoscopic images are displayed due to the generation of the cross talk CR. That is, the positions on the display screen to be positioned between the both eyes of the observers for allowing the observers to view the stereoscopic display image cannot be positioned at the centers of the observation ranges of the observers.

Therefore, in the image display apparatus 100 according to the second embodiment of the invention, the polarization controlling liquid crystal panel 7 has a structure of the electrodes 7d as shown in FIG. 15. In the image display apparatus 100 according to the second embodiment of the invention, the width of the electrodes 7d to which the voltage is applied includes the area of Gap 3 in the polarization controlling areas 7b. That is, the width of the electrodes 7d to which the voltage is applied matches the width of the polarization controlling area 7b. That is, the electrodes 7d to which the voltage is applied is formed to have a width which corresponds to one-fourth the width of the lens pattern 8a. In this configuration, the alignment of the liquid crystal over the entire polarization controlling area 7b can be changed, and hence the light rays entering the polarization controlling area 7b are polarized. Even though the width of the electrodes 7d to which the voltage is applied is formed to be one-fourth the width of the lens pattern 8a, there remains a certain distance between the electrodes 7d to which the voltage is applied and the electrodes 7d to which no voltage is applied, and hence there is no possibility of short circuit.

More specifically, the width of the lens pattern 8a is set to 500 to 700 μm, and the distance between the electrode 7d to which the voltage is applied and the electrode 7d to which no voltage is applied is set to 5 to 20 μm. Here, the widths of the electrodes of the electrodes 7d to which the voltage is applied and the electrodes 7d to which no voltage is applied are determined by the width of the lens pattern 8a and the distance between the electrode 7d to which the voltage is applied and the electrode 7d to which no voltage is applied. For example, when the width of the lens pattern 8a is set to 600 μm and the distance between the electrode 7d to which the voltage is applied and the electrode 7d to which no voltage is applied adjacent to each other is set to 20 μm, the width of the electrode 7d to which the voltage is applied is 150 μm, and the width of the electrode 7d to which no voltage is applied is 130 μm.

As described above, although the width of the electrode 7d to which the voltage is applied is formed to have a dimension one-fourth that of the lens pattern 8a, it is not limited to the case in which they are formed to have exactly one-fourth the dimension, but includes a case in which they are formed to have dimensions which can achieve the equivalent effect.

In this configuration, in the image display apparatus 100 according to the second embodiment, the areas of Gap 3 that allows the light rays in the state of having the first polarization axis to be outputted therethrough can be eliminated, so that the boundary As1 between the two display ranges in which the stereoscopic images are displayed respectively can be aligned with the center As0 of the display screen 2a as shown in FIG. 15, and the cross-talk area CR shown in FIG. 14 can be eliminated. Also, the stereoscopic display points DP1 can also be aligned with the center positions DP0 of the respective two display ranges in which the stereoscopic images are displayed. That is, the positions on the display screen to be positioned at the centers of the both eyes of the observers can be positioned at the centers of the observation areas of the observers, so as to allow the observers to view the stereoscopic display image.

As described thus far, in the case of the second embodiment, in the polarization controlling liquid crystal panel in which the width of the electrodes 7d to which the voltage is applied is formed to be larger than the width of the electrodes 7d to which no voltage is applied as in the first embodiment, it is understood that the area for outputting the light rays in the state of having the second polarization axis can be expanded in comparison with the polarization controlling liquid crystal panel in which the width of the electrodes 7d to which the voltage is applied and the width of the electrodes 7d to which no voltage is applied are the same, so that the areas of Gap 3 that allow the light rays in the state of having the first polarization axis to be outputted therethrough can be reduced. Accordingly, in the stereoscopic image display mode, the position of the boundary between the observation ranges of the observers at the different observing positions is prevented from being shifted from the center of the display screen. Also, the position on the display screens to be positioned at the center of both eyes of the observers for allowing the observers to view the stereoscopic image can be placed close to the center of the observation ranges of the observers.

In this arrangement, the output direction of the light rays having the first polarization axis and the light rays having the second polarization axis from the polarization axis controlling unit can be adjusted appropriately, and hence the quality of display can be adjusted appropriately.

Example of Application

In the respective embodiments shown above, the plurality of semi-column shaped lens patterns are formed in the lenticular lens 8 so as to extend toward the display panel. However, the direction of the semi-column shaped lens pattern is not limited thereto, and may be formed so as to extend in the opposite direction from the display panel, that is, the plurality of lens patterns 8a may be formed so as to extend toward the polarization controlling liquid crystal panel. Instead of the lenticular lens 8, a lens having linear lens pattern having other cross-sectional shape, for example, a plurality of lens patterns being triangular instead of semi-column shape in cross section may be used.

In the embodiments shown above, the lenticular lens 8 is an independent component in the image display apparatus 100. However, the configuration of the lenticular lens 8 is not limited thereto and, instead, one of the pair of substrates of the polarization controlling liquid crystal panel 7 may be formed into the shape of the lenticular lens so as to provide the polarization controlling liquid crystal panel 7 also with a function of the lenticular lens. In this configuration, the low-profile image display apparatus 100 is achieved.

In the respective embodiments shown above, the electrodes 7d are formed on the substrate on the light-outputting side in the stripe pattern. However, the electrodes 7d are not limited thereto, and the electrodes 7d may be formed on the substrate on the light-incident side in the stripe pattern.

The display panel may be of various types such as a liquid crystal panel, a plasma display panel, an organic EL (electroluminescence) display panel.

Electronic Equipment

Figure 16:
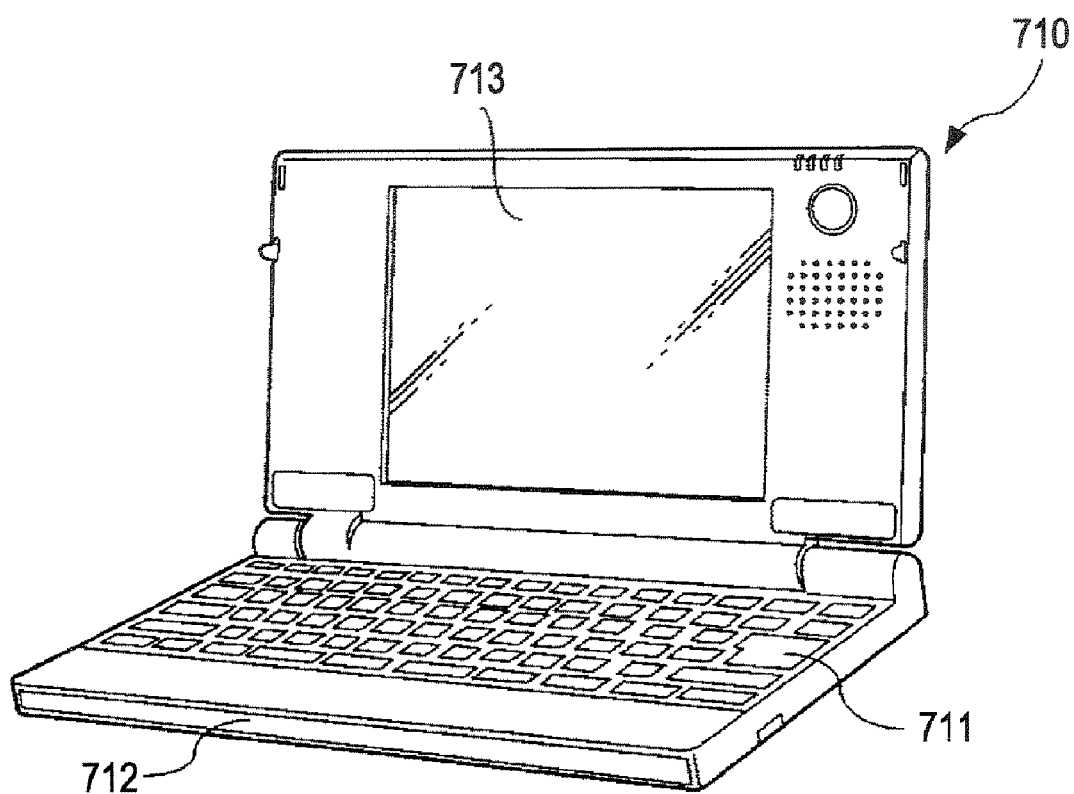
FIG. 16 shows an example of electronic equipment to which the image display apparatus according to the embodiments of the invention.

Referring now to FIG. 16, detailed examples of the electronic equipment to which the image display apparatus 100 according to the respective embodiments described above will be described.

The image display apparatus 10 according to the respective embodiment is applied to a display unit of a portable personal computer (so called laptop computer). FIG. 16 is a perspective view showing a configuration of this personal computer. As shown in FIG. 16, a personal computer 710 includes a main body portion 712 having a key board 711 and a display unit 713 to which the liquid crystal display apparatus 100 according to the embodiment of the invention is applied.

The image display apparatus 100 according to the respective embodiments are particularly preferable to be applied to the display unit of a liquid crystal TV and the car navigation system. For example, by employing the image display apparatus 100 according to the first embodiment to the display unit of the car navigation system, a map image can be displayed for the observer seated on a drivers seat, while movies such as films can be displayed for the observer sitting on the passenger's seat.

As the electronic equipment to which the image display apparatus 100 and so on according to the respective embodiments shown above, there are view-finder type or monitor-direct-viewing video tape recorders, pagers, electronic data book, calculators, cellular phones, word processors, workstations, TV-telephones, PS0 terminals, and digital still cameras in addition to those mentioned above.

The entire disclosure of Japanese Patent Application No. 2006-011172, filed Jan. 19, 2006 is expressly incorporated by reference herein.

What is claimed is:

1. An electro-optical apparatus comprising:
 a display panel having a first pixel array for displaying a first image and a second pixel array for displaying a second image;
 an illuminating device that generates light rays that pass through the display panel;
 a polarization axis controlling unit arranged between the illuminating device and the display panel, the polarization axis controlling unit including a liquid crystal layer, a plurality of first electrodes, and a plurality of second electrodes, the plurality of first electrodes and the plurality of second electrodes supply voltage to the liquid crystal layer, the plurality of first electrodes and the plurality of second electrodes are arranged in a stripe pattern and oppose one side of the liquid crystal layer, the polarization axis controlling unit permitting first light rays having a first polarization axis to pass in areas in which the second electrodes are arranged, the polarization axis controlling unit changing second light rays to a second polarization axis substantially orthogonal to the first polarization axis in areas in which the first electrodes are arranged, in response to voltage applied to the plurality of first electrodes; and
 a lens arranged between the polarization axis controlling unit and the display panel, the lens having a plurality of linear lens patterns configured to direct the first light rays and the second light rays to proceed in predetermined directions, respectively;
 wherein:
   a width of each of the first electrodes is greater than a width of each of the second electrodes;
   a plurality of gaps, each of which is defined between one first electrode of the plurality of first electrodes and one second electrode of the plurality of second electrodes;
   each of the linear lens patterns opposing at least one first electrode of the plurality of first electrodes, at least one second electrode of the plurality of second electrodes, and at least one gap of the plurality of gaps; and
   two gaps of the plurality of gaps and one second electrode of the plurality of second electrodes between the two gaps opposing a half portion or a quarter portion of one linear lens pattern of the linear lens patterns.

2. The electro-optical apparatus according to claim 1, further comprising:
 a plurality of sets of the electrodes, each set including only one first electrode and only one second electrode, each lens pattern has only one of the sets aligned therewith; and a wave plate between the lens and the display panel;

wherein voltage is applied to the first electrodes to provide light rays passing through a region of the liquid crystal layer aligned with the first electrodes with the second polarization axis;

wherein the wave plate and the linear lens patterns are configured to direct light rays having the first polarization axis to the first pixel array and a first viewer of the display panel;

wherein the wave plate and the linear lens patterns are configured to direct light rays having the second polarization axis to the second pixel array and a second viewer of the display panel; and wherein the first image of the first pixel array is different from the second image of the second pixel array to provide a two-screen display mode.

3. The electro-optical apparatus according to claim 1, further comprising:

a plurality of sets of the electrodes, each set including only one first electrode and only one second electrode, each lens pattern has only two of the sets aligned therewith; and a wave plate between the lens and the display panel;

wherein voltage is applied to the first electrodes to provide light rays passing through the region with the second polarization axis;

wherein the wave plate and the linear lens patterns are configured to direct light rays having the first polarization axis to the first pixel array and a right eye of both a first viewer and a second viewer;

wherein the wave plate and the linear lens patterns are configured to direct light rays having the second polarization axis to the second pixel array and a left eye of both a first viewer and a second viewer; and wherein the first image of the first pixel array is different from the second image of the second pixel array to provide a stereoscopic display mode.

4. Electronic equipment comprising the electro-optical apparatus according to claim 1 in a display unit.

5. An electro-optical apparatus comprising:

a display panel including a first pixel array for displaying a first image and a second pixel array for displaying a second image that is different from the first image;

a back light operable to supply light to the display panel;

a polarization controlling liquid crystal panel between the display panel and the back light including a plurality of first electrodes and a plurality of second electrodes arranged in a stripe pattern, the first electrodes are arranged in a first region of the liquid crystal panel and the second electrodes are arranged in a second region, voltage is applied to the first electrodes to change an orientation of liquid crystals in the first region such that light rays passing through the first region are changed from a first polarization axis to a second polarization axis that is opposite to the first, voltage is not applied to the second electrodes such that second light rays passing through the second region retain the first polarization axis;

a lens having a plurality of lens patterns that are each configured to direct the light rays having the first polarization axis and the light rays having the second polarization axis in different directions; and only one of the first electrodes and only one of the second electrodes oppose each of the lens patterns, each of the first electrodes have a width that is equal to half a width of the opposing lens pattern, and each of the second electrodes have a width that is less than half the width of the opposing lens pattern;

wherein a boundary between the first and the second images is at a center of the display panel and at a center of a lengthwise dimension of one of the lens patterns: and wherein gaps are defined between each one of the second electrodes and the first electrodes on opposite sides thereof, the gaps and the second electrode therebetween are aligned with the same half of the opposing lens pattern.

6. The electro-optical apparatus of claim 5, wherein the display panel includes a first polarization plate mounted to a display side of the display panel and a second polarization plate mounted to a back light side of the display panel, the first polarization plate has a polarization axis that is opposite to the second polarization plate.

7. The electro-optical apparatus of claim 5, further comprising a wave plate between the display panel and the back light that is configured to direct light rays having the first polarization axis to the first pixel array and to direct light rays having the second polarization axis to the second pixel array.

8. The electro-optical apparatus of claim 5, wherein the lens includes a lenticular lens.

9. The electro-optical apparatus of claim 5, wherein the lens patterns are semi-columnar-shaped and configured to direct light rays having the first polarization axis to a first viewer of the first pixel array at a first position and to direct light rays having the second polarization axis to a second viewer of the second pixel array at a second position that is laterally offset from the first position.

* * * * *